United States Patent
Yasushi et al.

(10) Patent No.: US 7,203,751 B2
(45) Date of Patent: Apr. 10, 2007

(54) MOBILE COMMUNICATION DEVICE AND METHOD

(75) Inventors: Mitsuo Yasushi, Tsurugashima (JP); Masatoshi Yanagidaira, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 550 days.

(21) Appl. No.: 09/961,282

(22) Filed: Sep. 25, 2001

(65) Prior Publication Data
US 2002/0046258 A1 Apr. 18, 2002

(30) Foreign Application Priority Data
Sep. 25, 2000 (JP) ............................. 2000-291127

(51) Int. Cl.
*G06F 15/173* (2006.01)

(52) U.S. Cl. ............... 709/225; 709/220; 709/222; 709/227; 709/238; 370/216; 370/252; 710/8

(58) Field of Classification Search ............... 709/250, 709/227, 225, 220, 238, 222; 710/8; 370/216, 370/252
See application file for complete search history.

(56) References Cited

U.S. PATENT DOCUMENTS

| | | | |
|---|---|---|---|
| 5,903,548 A | 5/1999 | Delamater | |
| 5,953,319 A | 9/1999 | Dutta et al. | |
| 6,215,774 B1* | 4/2001 | Knauerhase et al. | 370/252 |
| 6,587,034 B1* | 7/2003 | Heiman et al. | 340/7.55 |
| 6,681,259 B1* | 1/2004 | Lemilainen et al. | 709/250 |
| 6,766,160 B1* | 7/2004 | Lemilainen et al. | 455/411 |
| 6,816,730 B2* | 11/2004 | Davies et al. | 455/436 |
| 7,082,467 B2* | 7/2006 | Border et al. | 709/227 |
| 2001/0009553 A1* | 7/2001 | Homann | 370/445 |
| 2003/0021250 A1* | 1/2003 | Willins et al. | 370/338 |

FOREIGN PATENT DOCUMENTS

| | | |
|---|---|---|
| EP | 0998094 A2 | 5/2000 |
| WO | WO 99/60807 A1 | 11/1999 |
| WO | WO 01/45446 A1 | 6/2001 |

OTHER PUBLICATIONS

"Special Mobile Group: Scenarios and considerations for the introduction of the Universal Mobile Telecommunication System (UMTS) (UMTS01.04)", ETR 312, 'Online! Aug. 1996, pp. 1-55, XP002246150.

Glenn Collision, "DECT and Bluetooth Friends or Foes?", DECT99 World Congress, 'Online!, Jan. 28, 1999, pp. 1-29, XP002246162.

* cited by examiner

*Primary Examiner*—Patrice Winder
*Assistant Examiner*—Liang-che Alex Wang
(74) *Attorney, Agent, or Firm*—Sughrue Mion, PLLC

(57) ABSTRACT

A mobile communication device which selects one of a plurality of radio transmitting/receiving devices different at least in data communication speed from one another in accordance with the type of data to be transmitted or received, and controls a data communication by the selected one radio transmitting/receiving device.

18 Claims, 26 Drawing Sheets

FIG. 7A

VEHICLE DATA

BODY NUMBER
COLOR
MODEL
OWNER

MAINTENANCE INFORMATION

[RETURN]

FIG. 7B

TRAVELING DATA

CURRENT POSITION
EAST LONGITUDE ******
NORTH LATITUDE ******

| DATE AND TIME | TIME | LOCA-TION | SPEED | CONDI-TION |
|---|---|---|---|---|
| ** | ** | ** | ** | ** |
| ** | ** | ** | ** | ** |

[RETURN]

FIG. 7C

DRIVER DATA

NAME
BLOOD TYPE
SEX
AGE                [HEAD]
HEIGHT
WEIGHT
COMMUNICATION

[RETURN]

FIG. 7D

MUSIC DATA

| NO. | TITLE | DURATION |
|---|---|---|
| 1 | ****** | **** |
| 2 | ****** | **** |
| 3 | ****** | **** |
| 4 | ****** | **** |
| 5 | ****** | **** |
| 6 | ****** | **** |

[DOWNLOAD]
[UPLOAD]   [RETURN]

FIG. 7E

MAP DATA

| MAP NAME | UPDATED DATE |
|---|---|
| SOUTH KANTO REGION | , |
| NORTH KANTO REGION | , |
| TOKYO METOROPOLITAN | , |
| KAWASAKI CITY | , |
| SAITAMA PREFECTURE | , |
| NIIGATA PREFECTURE | , |

[RETURN]

FIG. 7F

ADDRESS BOOK

| NAME | TELEPHONE | ADDRESS |
|---|---|---|
| ** | ** | **** |
| ** | ** | **** |
| ** | ** | **** |

[RETURN]

FIG. 14

| TYPE | UPDATE CYCLE | PRECEDING UPDATE DATE AND TIME |
|---|---|---|
| VEHICLE DATA | ONE WEEK | XXXX : YY : ZZ 12:10 |
| DRIVER DATA | START OF VEHICLE | XXXX : YY : ZZ 11:03 |
| MUSIC DATA | TWICE A DAY | XXXX : YY : ZZ 12:00 |
| MAP DATA | ONCE A MONTH | XXXX : YY : ZZ 09:45 |
| TRAVELING DATA | EVERY 10 MINUTES | XXXX : YY : ZZ 12:50 |
| ADDRESS BOOK DATA | ONCE A DAY | XXXX : YY : ZZ 10:10 |
| EMERGENCY DATA | OCCURRENCE OF EMERGENCY | XXXX : AY : GH 17:30 |

FIG. 20

| DEVICE OR SERVER / TYPE | VEHICLE MANAGEMENT CENTER DEVICE | TRAVELING MANAGEMENT CENTER DEVICE | HOME SERVER | OFFICE SERVER | MUSIC DELIVERY CENTER DEVICE | EMERGENCY MESSAGE CENTER DEVICE |
|---|---|---|---|---|---|---|
| VEHICLE DATA | ○ | ○ | ○ | ○ | × | ○ |
| DRIVER DATA | ○ | ○ | ○ | ○ | ○ | ○ |
| MUSIC DATA | × | × | ○ | ○ | ○ | × |
| MAP DATA | ○ | ○ | ○ | ○ | × | ○ |
| TRAVELING DATA | × | ○ | ○ | × | × | ○ |
| ADDRESS BOOK DATA | × | × | ○ | ○ | × | × |
| EMERGENCY DATA | × | × | ○ | × | × | ○ |

FIG. 23

| TYPE / USER GROUP | OWNER | FAMILY MEMBER | FRIEND | SECURITY COMPANY | POLICE | FIRE STATION | REPAIR SHOP |
|---|---|---|---|---|---|---|---|
| VEHICLE DATA | ○ | ○ | ○ | ○ | ○ | ○ | ○ |
| DRIVER DATA | ○ | ○ | ○ | ○ | × | ○ | × |
| MUSIC DATA | ○ | × | ○ | × | × | × | × |
| MAP DATA | ○ | ○ | × | ○ | ○ | × | × |
| TRAVELING DATA | ○ | × | × | × | × | × | ○ |
| ADDRESS BOOK DATA | ○ | × | × | × | × | × | × |

MOBILE COMMUNICATION DEVICE AND METHOD

BACKGROUND OF THE INVENTION

1. Field of the Invention

The present invention relates to a mobile communication device and method for communicating data through a predetermined network line such as the Internet.

2. Description of the Related Background Art

It is known to utilize a mobile telephone equipped in a vehicle to communicate data from the vehicle to a WWW server on the Internet. For example, a WWW server can be accessed from a vehicle to acquire map data near a current location, or to notify a traveling management center of data on a current traveling condition. It is also possible to download music data from a center station which delivers music data to enjoy music in the vehicle.

However, such a conventional mobile communication device using the mobile telephone has a problem of inability to perform stable data communications depending on the location at which the mobile unit is situated, because of the mobile unit located outside of the coverage area, and a requirement for a long time for transmission/reception of data depending on the type of data due to a low communication speed, even if a stable communication can be provided within a coverage area.

SUMMARY OF THE INVENTION

It is object of the present invention to provide a mobile communication device and method which are capable of efficiently communicating data through a predetermined network line in accordance with a location at which a mobile unit is situated, and the type of data.

According to the present invention, there is provided a mobile communication device for communicating data through a predetermined network line, comprising: a plurality of radio transmitting/receiving devices which are different at least in data communication speed from one another; selecting means for selecting one of the plurality of radio transmitting/receiving devices in accordance with a data type of data signal to be transmitted or received; and control means for controlling a data communication by the one radio transmitting/receiving device selected by the selecting means.

According to the present invention, there is provided a mobile communicating method for communicating data through a predetermined network line, comprising the steps of: selecting one of a plurality of radio transmitting/receiving devices which are different at least in data communication speed from one another in accordance with a data type of data signal to be transmitted or received; and controlling a data communication by the selected one radio transmitting/receiving device.

BRIEF DESCRIPTION OF THE DRAWINGS

FIGS. 7A through 7F are diagrams illustrating exemplary displays on the display screen of the onboard terminal device;

FIG. 14 is a diagram showing an update table;

FIG. 20 is a diagram showing the contents of an access right table;

FIG. 23 is a diagram showing the contents of an access right table;

DETAILED DESCRIPTION OF THE PREFERRED EMBODIMENTS

In the following, embodiments of the present invention will be described in detail with reference to the accompanying drawings.

Figure 1:
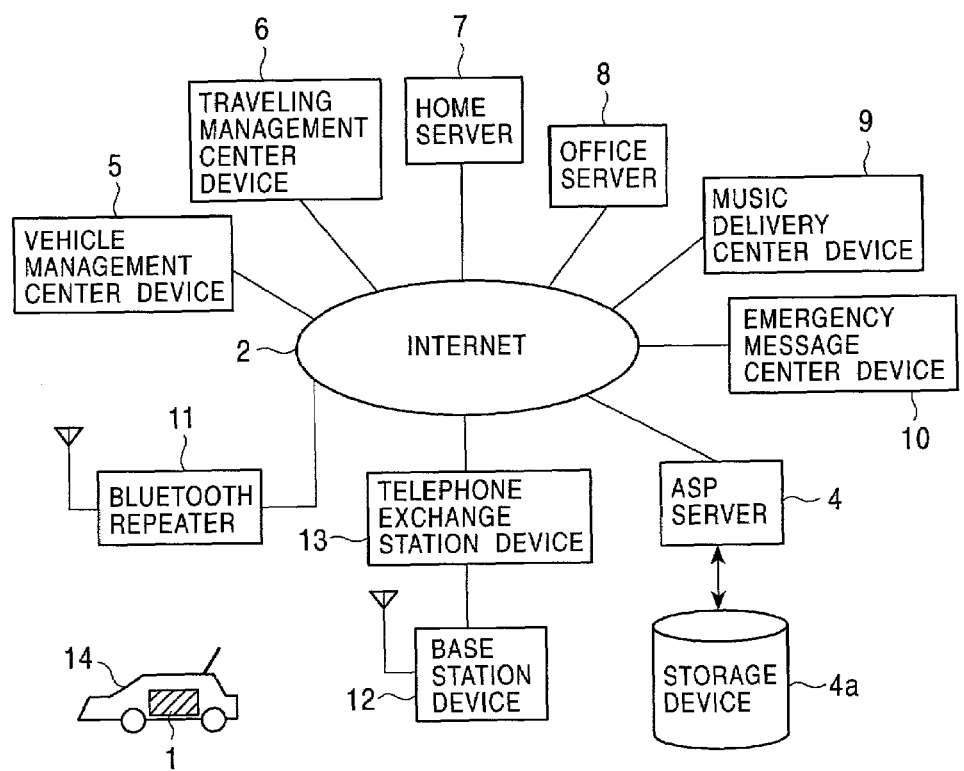
FIG. 1 is a block diagram illustrating the configuration of a communication system to which the present invention is applied.

FIG. 1 illustrates the configuration of a communication system to which the present invention is applied. In the illustrated communication system, an onboard terminal device 1 is equipped as a mobile communication device in a vehicle 14. The onboard terminal device 1 is capable of connecting to the Internet 2 through communication paths by a plurality of radio transmission/reception methods having different technical standards. In this communication system, a Bluetooth (short range radio data communication technique) communication bath using Bluetooth, and a mobile telephone communication path using a mobile telephone 22 are used. In addition to these communication paths, communication paths of other technical standards other technical standards may be added. In the communication paths of the other technical standards, there is a communication path using an ETC (Electronic Toll Collection System) microwave.

On the Bluetooth communication path, a Bluetooth repeater 11 is disposed at a location which should serve as an access point. The Bluetooth repeater 11 is connected to the Internet 2 for transmitting/receiving data with a Bluetooth transmitter/receiver 21 in the onboard terminal device 1 by a radio signal. Although only the Bluetooth repeater 11 is shown in FIG. 1, such Bluetooth repeaters are disposed at respective access points for Bluetooth, specifically, at stores facing a street such as a gas station.

On the mobile telephone path, the mobile telephone 22 is provided in the onboard terminal device 1. The mobile telephone 22 has a telephone function and a packet communication function, and is connected to the Internet 2 through a base station device 12 and a telephone exchange station device 13. The telephone exchange station device 13 is provided with an Internet connecting function. The mobile telephone 22 may be a cellular telephone and an onboard telephone.

The Bluetooth communication path is utilized when the onboard terminal device 1 is located within a narrow communication range of 10 to 100 m, for example, from an access point for Bluetooth. On the other hand, the mobile telephone communication path is utilized when the onboard terminal device 1 is located out of a communication range of an access point for Bluetooth. Therefore, when a communication of data including preferential contents such as emergency data is required, as later described, the mobile telephone communication path, which is substantially provided for communications at all times, is used. However, since the Bluetooth communication path provides for a faster communication than the mobile telephone communication path, the Bluetooth communication path capable of high speed communications is useful for a communication of data which does not include preferential contents but has a large amount of data such as music data.

Figure 2:
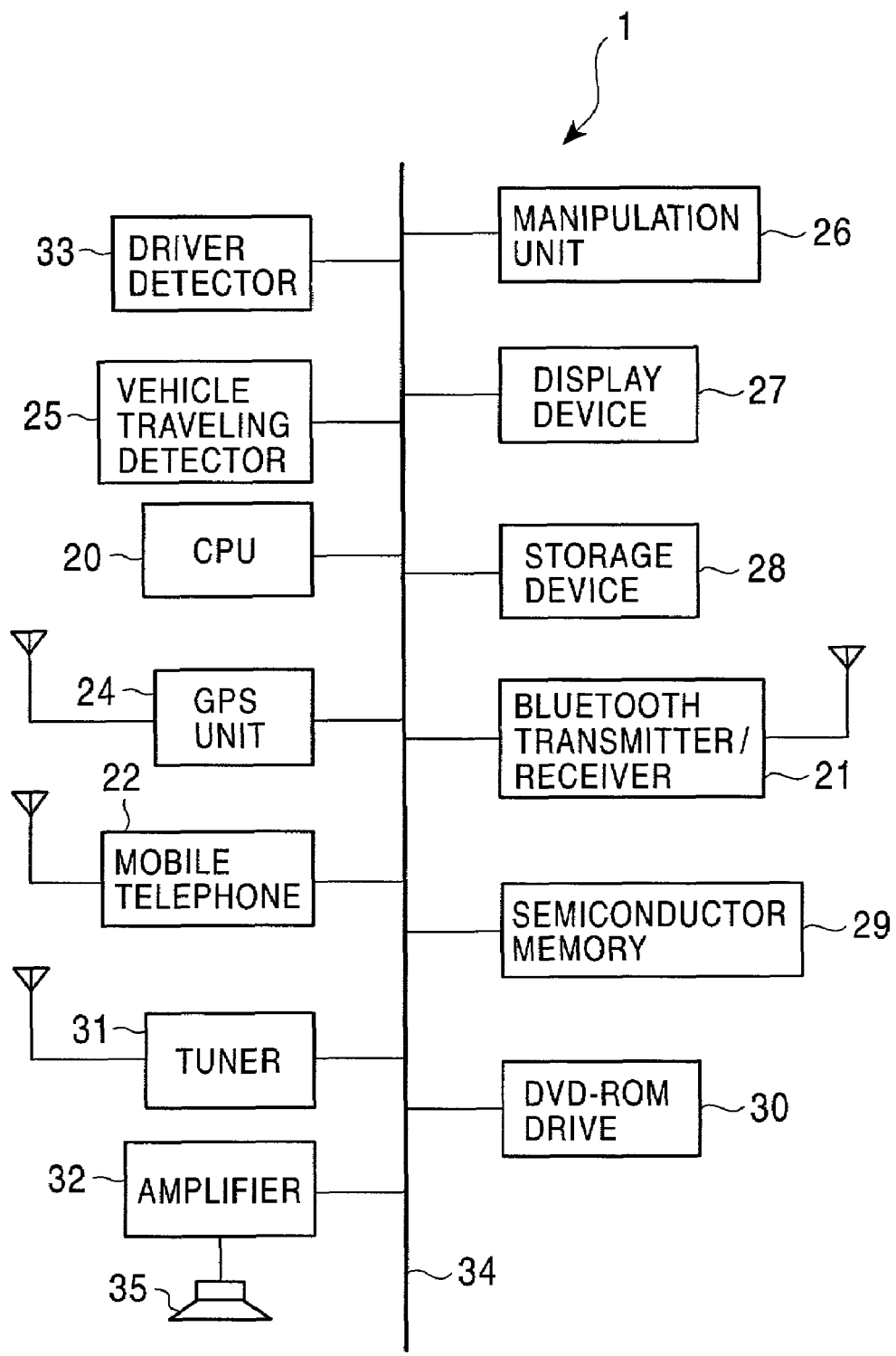
FIG. 2 is a block diagram illustrating the configuration of an onboard terminal device.

As illustrated in FIG. 2, the onboard terminal device 1 includes a CPU 20; a Bluetooth transmitter/receiver 21; a mobile telephone 22; a GPS (Global Positioning System) unit 24; a vehicle traveling detector 25; a manipulation unit 26; a display device 27; a storage device 28; a semiconductor memory 29; a DVD-ROM drive 30; a tuner 31; an amplifier 32; and a driver detector 33, all of which are commonly connected to a bus 34.

The GPS unit 24 detects a current position of the vehicle 14. The vehicle traveling detector 25 detects a traveling condition of the vehicle 14, for example, a vehicle speed, a rotational speed of the engine, an intake pipe pressure of the engine, or the like.

The storage device 28 includes a hard disk for storing vehicle-related data of a client such as vehicle data, driver data, music data, map data, traveling data, and address book data to form a database. In addition, the storage device 28 may store access points other than the vehicle-related data, as later described. The semiconductor memory 29 stores temporary data.

The driver detector 33 detects a parameter of a driver which can identify the driver such as a voice print, iris, and finger print. The CPU 20 confirms that a driver has changed and that a current driver is a previously registered driver, in accordance with an output signal from the driver detector 33. The registered driver has previously entered driver data such as the name, sex, address, driver identifiable parameter and so on, and the driver data is stored in the storage device 28.

The tuner 31 receives radio waves of television and radio broadcasting. The amplifier 32 has a built-in D/A converter for converting digital audio data to an analog signal to drive a speaker 35 in accordance with an output signal of the tuner 31 or an output signal of the D/A converter.

Figure 3:
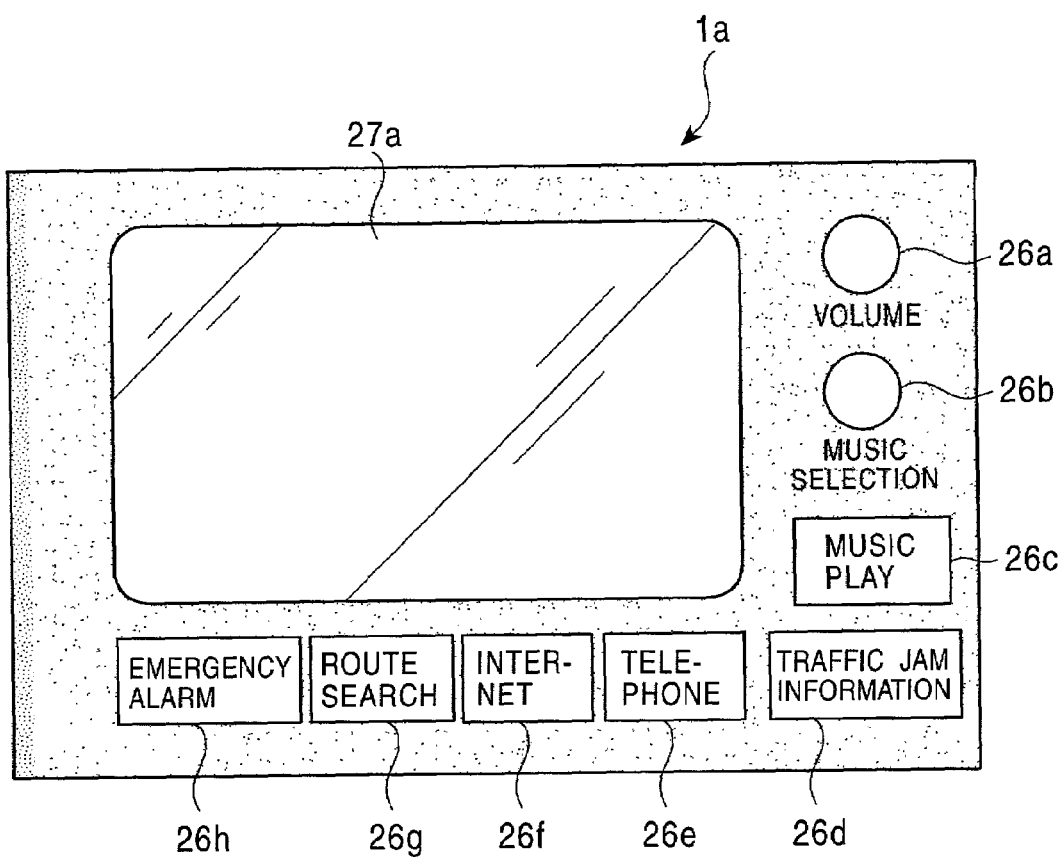
FIG. 3 is a diagram illustrating a front panel of the onboard terminal device.

FIG. 3 illustrates a front panel 1a of the onboard terminal device 1. Manipulating pieces in the manipulation unit 26, and a display screen 27a of the display device 27 are arranged on the front panel. The manipulating pieces in the manipulation unit 26 include a volume knob 26a, a music selector knob 26b, a music play button 26c, a traffic jam information button 26d, a telephone button 26e, an Internet button 26f, a route search button 26g, and an emergency alarm button 26h, as illustrated in FIG. 3.

Figure 4A:
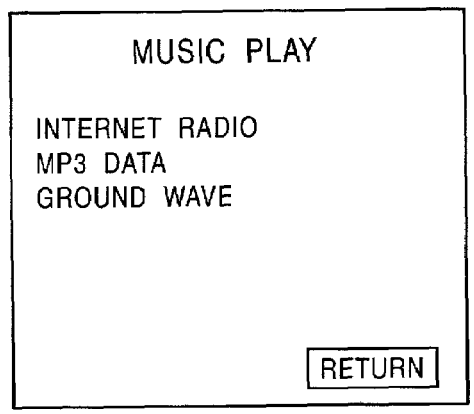
FIGS. 4A through 4E are diagrams illustrating exemplary displays on a display screen of the onboard terminal device.

As the driver manipulates the music play button 26c, a window for "Music Play" is displayed on the display screen 27a, as illustrated in FIG. 4A, wherein options "Internet Radio," "MP3 Data" and "Ground Wave" are displayed thereon.

Figure 4B:
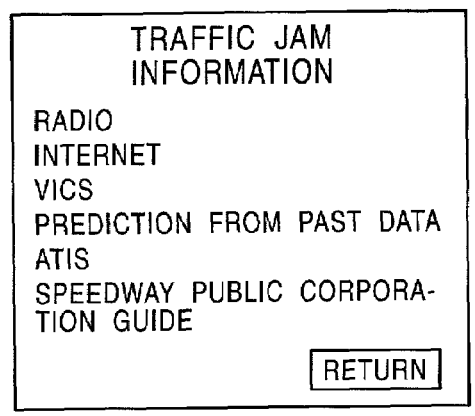

As the driver manipulates the traffic jam information button 26d, a window for "Traffic Jam Information" is displayed on the display screen 27a, as illustrated in FIG. 4B, wherein options "Radio," "Internet," "VICS," "Forecast from Past Data," "ATIS," and "Speedway Public Corporation Guide" are displayed thereon. "VICS" stands for Vehicle Information and Communication System and "ATIS" stands for Advanced Traffic Information Service.

Figure 4C:
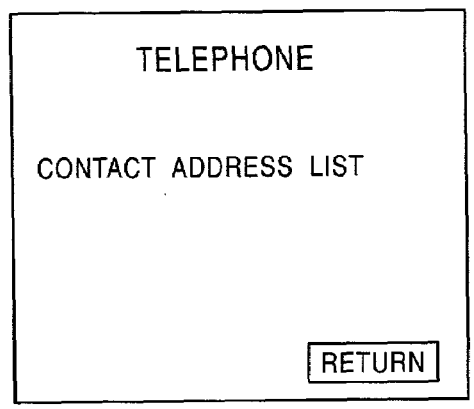

As the driver manipulates the telephone button 26e, a window for "Telephone" is displayed on the display screen 27a, as illustrated in FIG. 4C, wherein an option "Contact Address List" is displayed.

As the driver manipulates the Internet button 26f, a WWW browser is started, though not shown, causing a window for the browser to appear on the display window 27a.

Figure 4D:
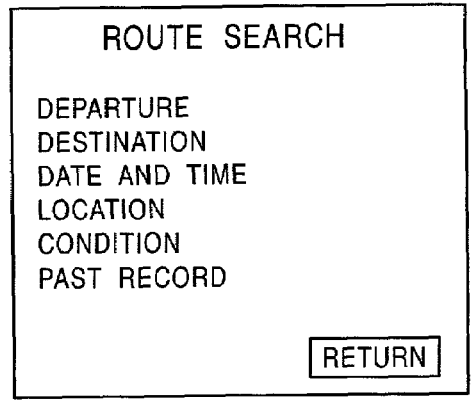

As the driver manipulates the route search button 26g, a window for "Route Search" is displayed on the display screen 27a, as illustrated in FIG. 4D, wherein options "Departure," "Destination," "Date and Time," "Location," "Condition," and "Past Record" and a map are displayed thereon.

Figure 4E:
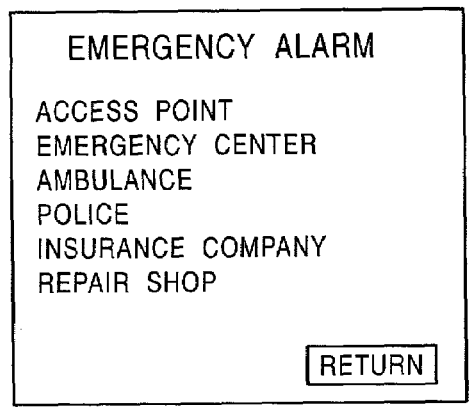

As the driver manipulates the emergency alarm button 26h, a window for "Emergency Alarm" is displayed on the display screen 27a, as illustrated in FIG. 4E, wherein options "Access Point," "Emergency Center," "Ambulance," "Police," "Insurance Company," and "Repair Shop" are displayed thereon.

By again selecting one of the options displayed on the display screen 27a as described above, further items are displayed. However, subsequent display of items on the display screen 27a is not directly related to the present invention, so that description thereon is omitted.

The Internet 2 is connected to an ASP (Application Service Provider) server 4. The ASP server 4 communicates with the onboard terminal device 1 in response to an access from the onboard terminal device 1 to operate for storing the vehicle-related data as described above of each vehicle in the storage device 4a. In other words, a database for the vehicle-related data is formed in the storage device 4a.

The Internet 2 is also connected to a vehicle management center device 5 in a vehicle management center for managing respective vehicles themselves; a traveling management center device 6 in a traveling management center for managing a traveling condition of each vehicle; a home server 7 of a vehicle owner; an office server 8 in a vehicle owner's place of business; a music delivery center device 9 in a music delivery center for delivering music data; and an emergency alarm center device 10 in an emergency alarm center in a hospital or a police station, as illustrated in FIG. 1. Each of the vehicle management center device 5, traveling management center device 6, home server 7, office server 8, music delivery center device 9, and emergency alarm center device 10 is a terminal device which communicates with the ASP server 4 through the Internet 2.

The vehicle management center device 5 accesses the ASP server 4 to manage each vehicle by using vehicle data stored in the storage device 4a. The traveling management center device 6 accesses the ASP server 4 to manage the traveling of each vehicle by using traveling data stored in the storage device 4a. The home server 7 is installed in the user's home. The music delivery center device 9, for example, accesses the ASP server 4 to receive music data from a terminal device in addition to the delivery of MP3 or AAC formatted music data to terminal devices and servers. The emergency alarm center device 10 receives an emergency alarm directly or through the ASP server 4 when an emergency such as an accident occurs in the vehicle.

Figure 5A:
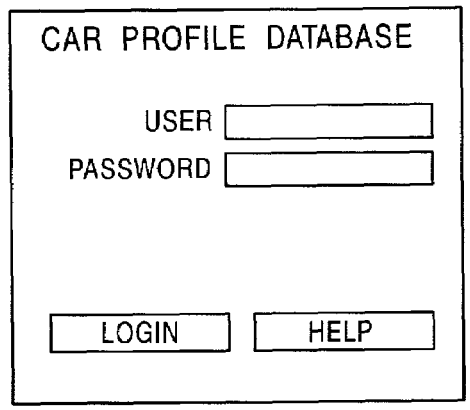
FIGS. 5A through 5F are diagrams illustrating exemplary displays on the display screen of the onboard terminal device.
Figure 5B:
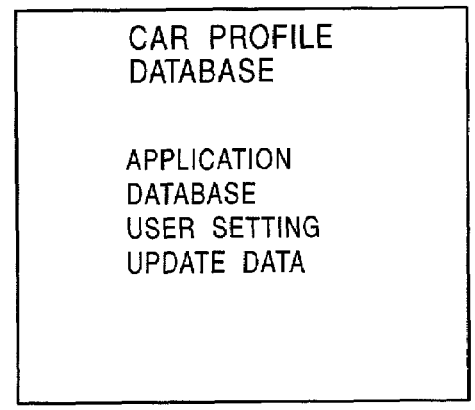

As any of the devices 5, 6, 9, and 10 and the servers 7, and 8 accesses the APS server 4 through the Internet 2 in accordance with a protocol such as HTTP, information transmitted from the ASP server 4, responsive to the access, displays a screen for entering a user ID and a password, as illustrated in FIG. 5A. On this screen, the user enters a user ID and a password, and manipulates a "LOGIN" button, causing a selection screen to appear as illustrated in FIG. 5B. Specifically, options "Application," "Database," "User Setting," and "Update Data" are displayed on the screen.

Figure 5C:
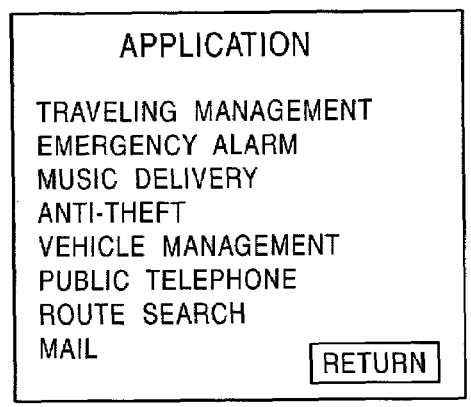
Figure 6A:
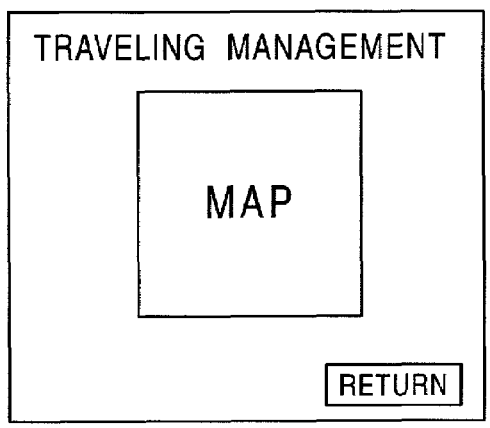
FIGS. 6A through 6H are diagrams illustrating exemplary displays on the display screen of the onboard terminal device.

As the user selects "Application" through his manipulation, options consisting of "Traveling Management," "Emergency Alarm," "Music Delivery," "Anti-theft," "Vehicle Management," "Public Telephone," "Route Search," and "Mail" are displayed as illustrated in FIG. 5C. When the user selects "Traveling Management" through his manipulation, the ASP server 4 reads a vehicle management program from the storage device 4a, and executes the vehicle management program to transmit display data to an accessing device or server through the Internet 2. In the accessing device or server, display data of the vehicle management program sent from the ASP server 4 is displayed as illustrated in FIG. 6A.

Figure 6B:
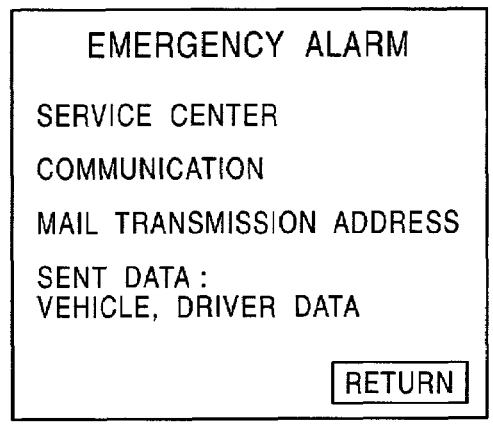

As the user selects "Emergency Alarm," the ASP server 4 reads an emergency alarm program from the storage device 4a, and executes the emergency alarm program to transmit display data to an accessing device or server through the Internet 2. In the accessing device or server, display data of the emergency alarm program sent from the ASP server 4 is displayed as illustrated in FIG. 6B.

Figure 6C:
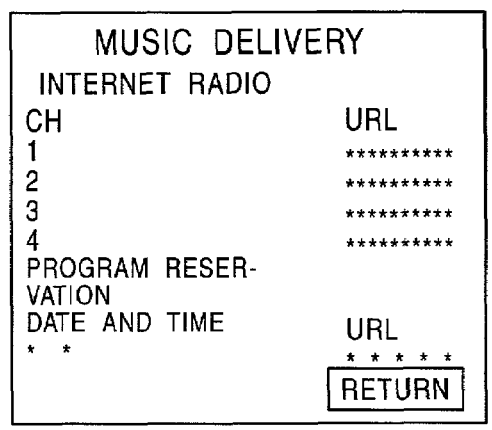

As the user selects "Music Delivery," the ASP server 4 reads a music delivery program from the storage device 4a, and executes the music delivery program to transmit display data to an accessing device or server through the Internet 2. In the accessing device or server, display data of the music delivery program sent from the ASP server 4 is displayed as illustrated in FIG. 6C.

Figure 6D:
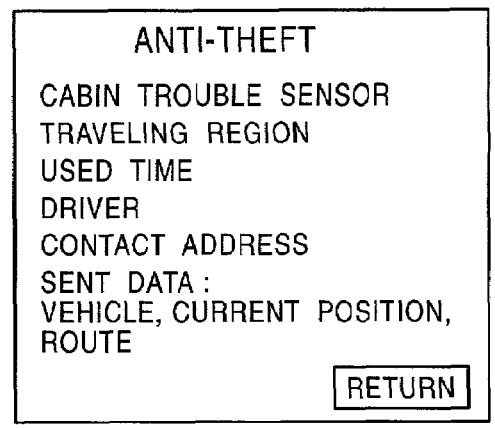

As the user selects "Anti-theft," the ASP server 4 reads an anti-theft program from the storage device 4a, and executes the anti-theft program to transmit display data to an accessing device or server through the Internet 2. In the accessing device or server, display data of the anti-theft program sent from the ASP server 4 is displayed as illustrated in FIG. 6D.

Figure 6E:
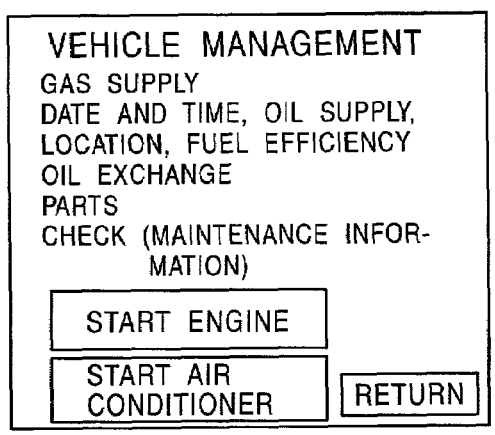

As the user selects "Vehicle Management," the ASP server 4 reads a vehicle management program from the storage device 4a, and executes the vehicle management program to transmit display data to an accessing device or server through the Internet 2. In the accessing device or server, display data of the vehicle management program sent from the ASP server 4 is displayed as illustrated in FIG. 6E.

Figure 6F:
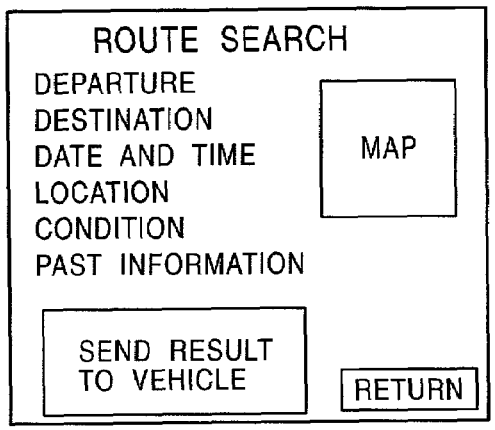

As the user selects "Route Search," the ASP server 4 reads a route search program from the storage device 4a, and executes the route search program to transmit display data to an accessing device or server through the Internet 2. In the accessing device or server, display data of the route search program sent from the ASP server 4 is displayed as illustrated in FIG. 6F.

Figure 6G:
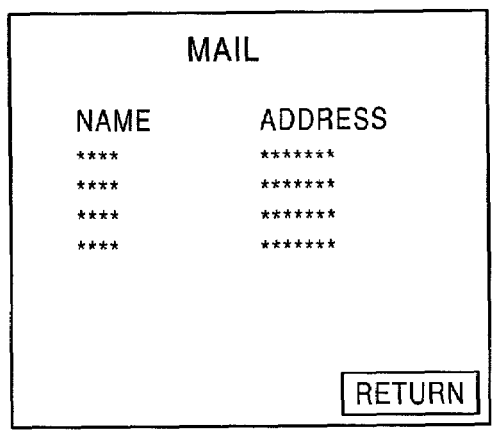

As the user selects "Mail," the ASP server 4 reads a mail program from the storage device 4a, and executes the mail program to transmit display data to an accessing device or server through the Internet 2. In the accessing device or server, display data of the mail program sent from the ASP server 4 is displayed as illustrated in FIG. 6G.

Figure 6H:
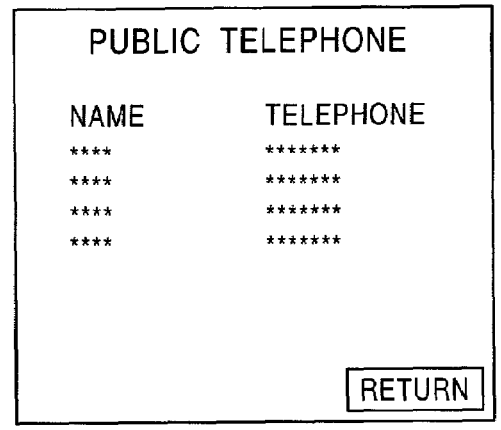

As the user selects "Public Telephone," the ASP server 4 reads a public telephone program from the storage device 4a, and executes the public telephone program to transmit display data to an accessing device or server through the Internet 2. In the accessing device or server, display data of the public telephone program sent from the ASP server 4 is displayed as illustrated in FIG. 6H.

Figure 5D:
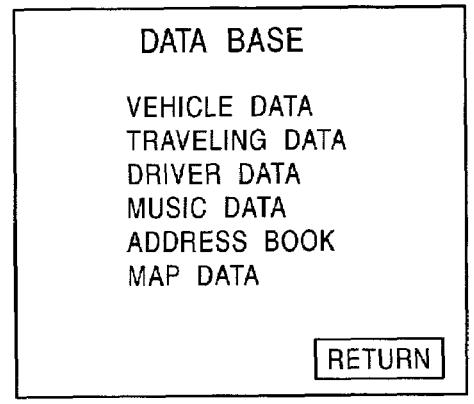

As the user selects "Database" through his manipulation, options consisting of "Vehicle Data," "Traveling Data," "Driver Data," "Music Data," "Address Book Data," and "Map Data" are displayed as illustrated in FIG. 5D.

As the user selects "Vehicle Data," the ASP server 4 reads vehicle data from the storage device 4a, and transmits the read vehicle data to an accessing device or server through the Internet 2. In the accessing device or server, the vehicle data sent from the ASP server is displayed, for example, as illustrated in FIG. 7A. As the user selects "Traveling Data," traveling data is transmitted from the ASP server 4 to an accessing device or server through similar operations to those performed for the vehicle data. In the accessing device or server, the traveling data is displayed, for example, as illustrated in FIG. 7B. As the user selects "Driver Data," driver data is transmitted from the ASP server 4 to an accessing device or server through similar operations to those performed for the vehicle data. In the accessing device or server, the driver data is displayed, for example, as illustrated in FIG. 7C. As the user selects "Music Data," music data is transmitted from the ASP server 4 to an accessing device or server through similar operations to those performed for the vehicle data. In the accessing device or server, the music data is displayed, for example, as illustrated in FIG. 7D. As the user selects "Map Data," map data is transmitted from the ASP server 4 to an accessing device or server through similar operations to those performed for the vehicle data. In the accessing device or server, the map data is displayed, for example, as illustrated in FIG. 7E. As the user selects "Address Book Data," address book data is transmitted from the ASP server 4 to an accessing device or server through similar operations to those performed for the vehicle data. In the accessing device or server, the address book data is displayed, for example, as illustrated in FIG. 7F.

Figure 5E:
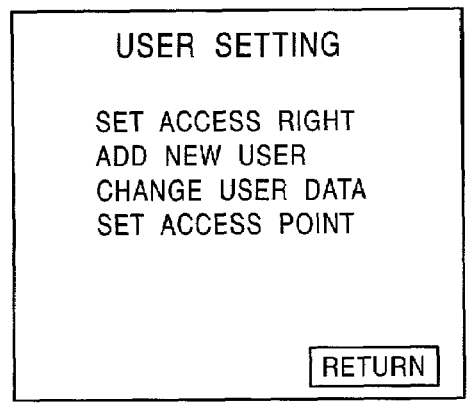

As the user selects "User Setting" through his manipulation, options consisting of "Set Access Right," "Add New User," "Change User Data" and "Set Access Point" are displayed as illustrated in FIG. 5E.

Figure 5F:
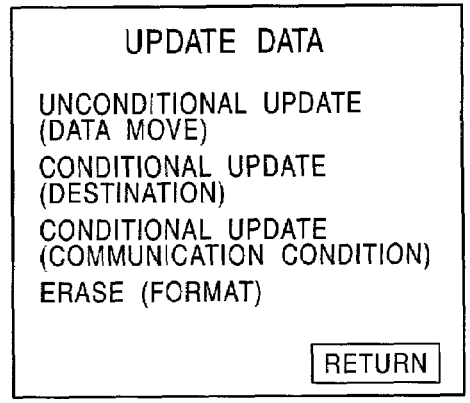

As the user selects "Update data" through his manipulation, options consisting of "Unconditional Update (Data Move)," "Conditional Update (Destination)," "Conditional Update (Communication Condition)" and "Erase (Format)" are displayed as illustrated in FIG. 5F.

Next, a communication control operation executed by the CPU 20 of the onboard terminal device 1 will be described with reference to FIGS. 8 through 19.

Figure 8:
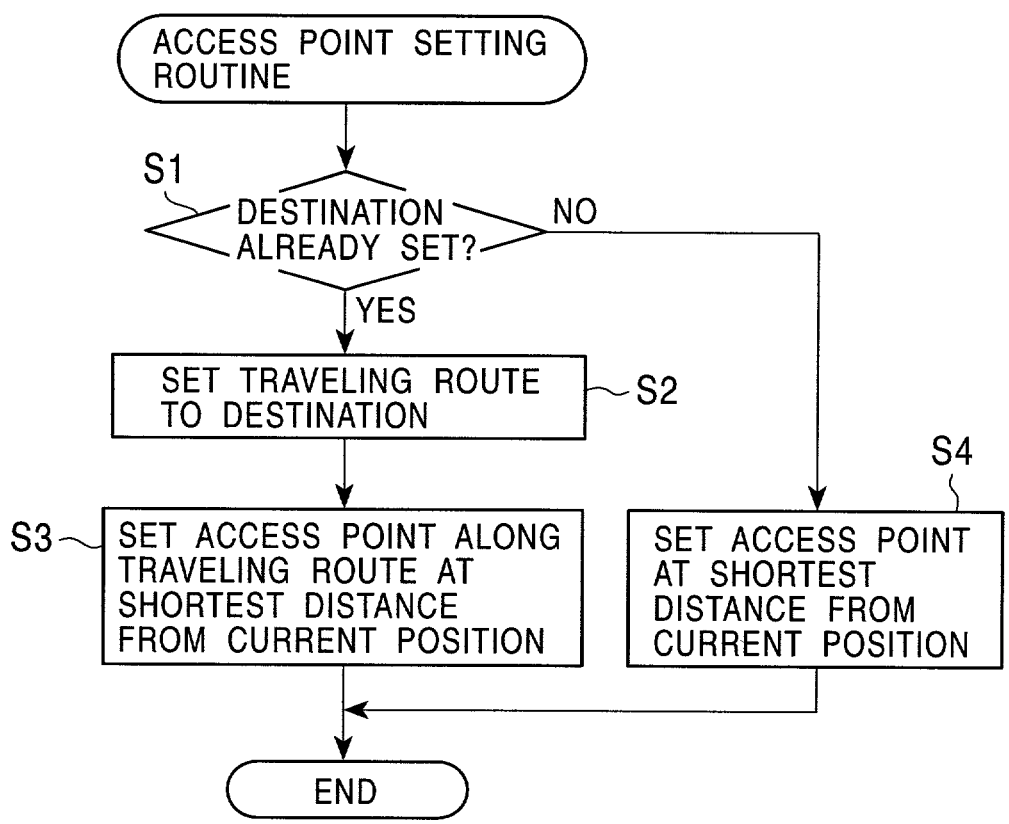
FIG. 8 is a flow chart illustrating an access point setting routine.

The CPU 20 first executes an access point setting routine. In the access point setting routine, as illustrated in FIG. 8, the CPU 20 determines whether or not a destination has been set for the vehicle 14 (step S1). The destination is set through a manipulation on the aforementioned route search button 26g. If the destination has been set, the CPU 20 sets a traveling route to the destination (step S2), and extracts the access point nearest from a current position of the vehicle 14 from among access points along the route (step S3). If no destination has been set, the CPU 20 extracts an access point near the current position of the vehicle 14 (step S4). Access points within a region about the current position (for example, within a radius of 100 km) have been previously stored in the storage device 28 or a DVD-ROM together with map data. With a DVD, the access point is read by the DVD-ROM drive 30. Since the current position is detected by the GPS unit 24, the access point is searched for from the storage device 28 or DVD-ROM based on the current position detected by the GPS unit 24 either at step S2 or S4. The access point is set for each of the Bluetooth communication path and mobile telephone communication path, and the access point set for each of the communication paths is stored in the memory 29 as an access point for Bluetooth and an access point for mobile telephone.

While the traveling route to the destination is automatically set at step S2, the user such as a driver can selectively set a traveling route on a map displayed on the displayed screen 27a in response to a manipulation on the route search button 26g with a pointer for saving in the memory 29, so that when a traveling route has already been set, the CPU 20 reads the set traveling route from the memory 29 at step S2, and sets an access point in accordance with the set traveling route at step S3.

At step S4, the CPU 20 simply sets the access point at the shortest distance from the current position.

Alternatively, a traveling route from the current position to the destination can be automatically searched for in accordance with road data stored in the storage device 28 or DVD-ROM. As a result of the search, if a plurality of traveling routes are retrieved, these traveling routes may be displayed on the display screen 27a for letting the user select one from them.

For an access point for mobile telephone, if the vehicle 14 is located within an available cell, the mobile telephone 22 automatically communicates with a base station device of the cell through a control channel and has information on access points, so that the CPU 20 can acquire access points for mobile telephone from the mobile telephone 22. If the vehicle 14 is located in a region out of a cell where a call is not available, the CPU 20 searches the storage device 28 or DVD-ROM for an access point.

Figure 9:
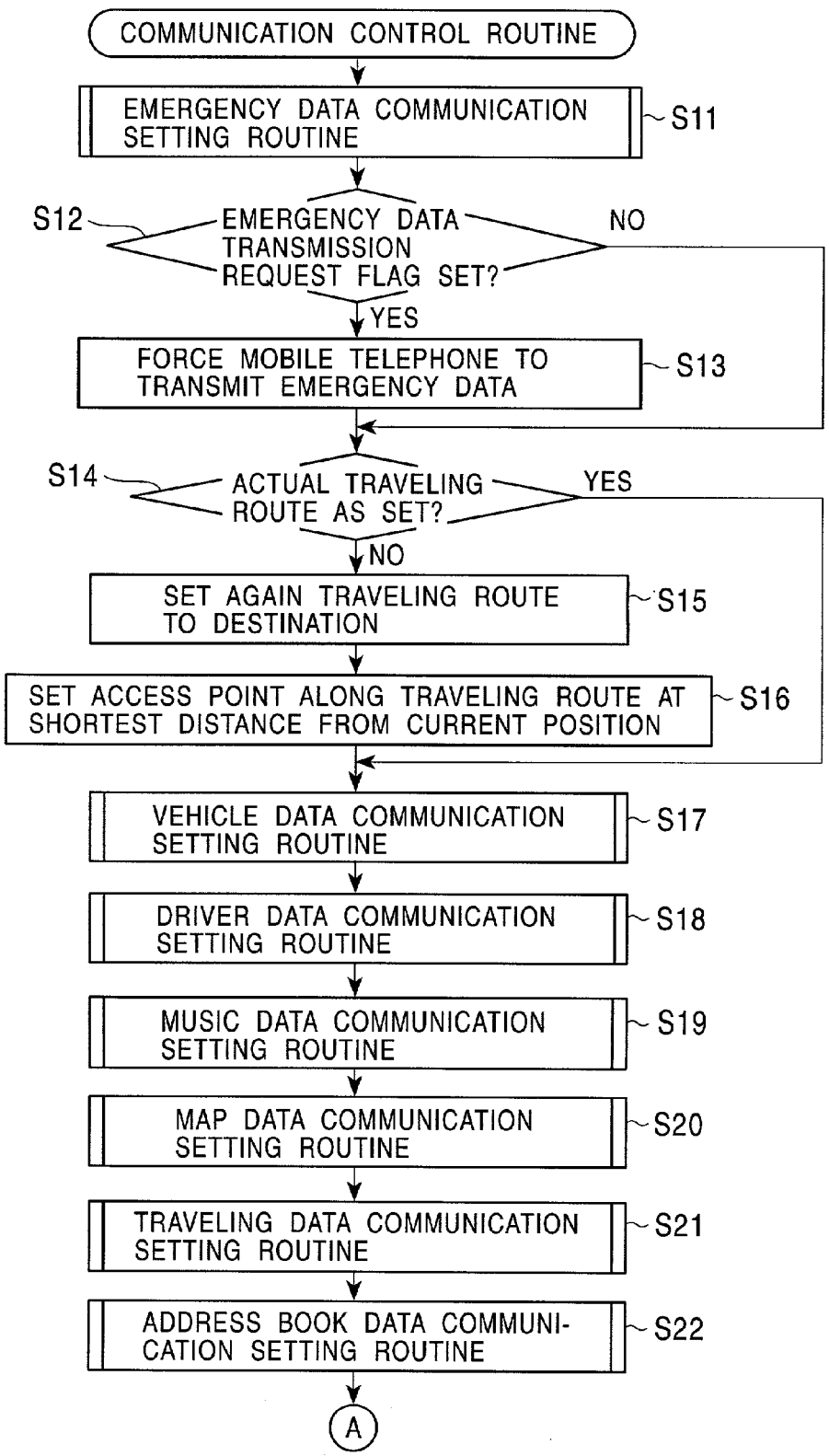
FIG. 9 is a flow chart illustrating a communication control routine.
Figure 10:
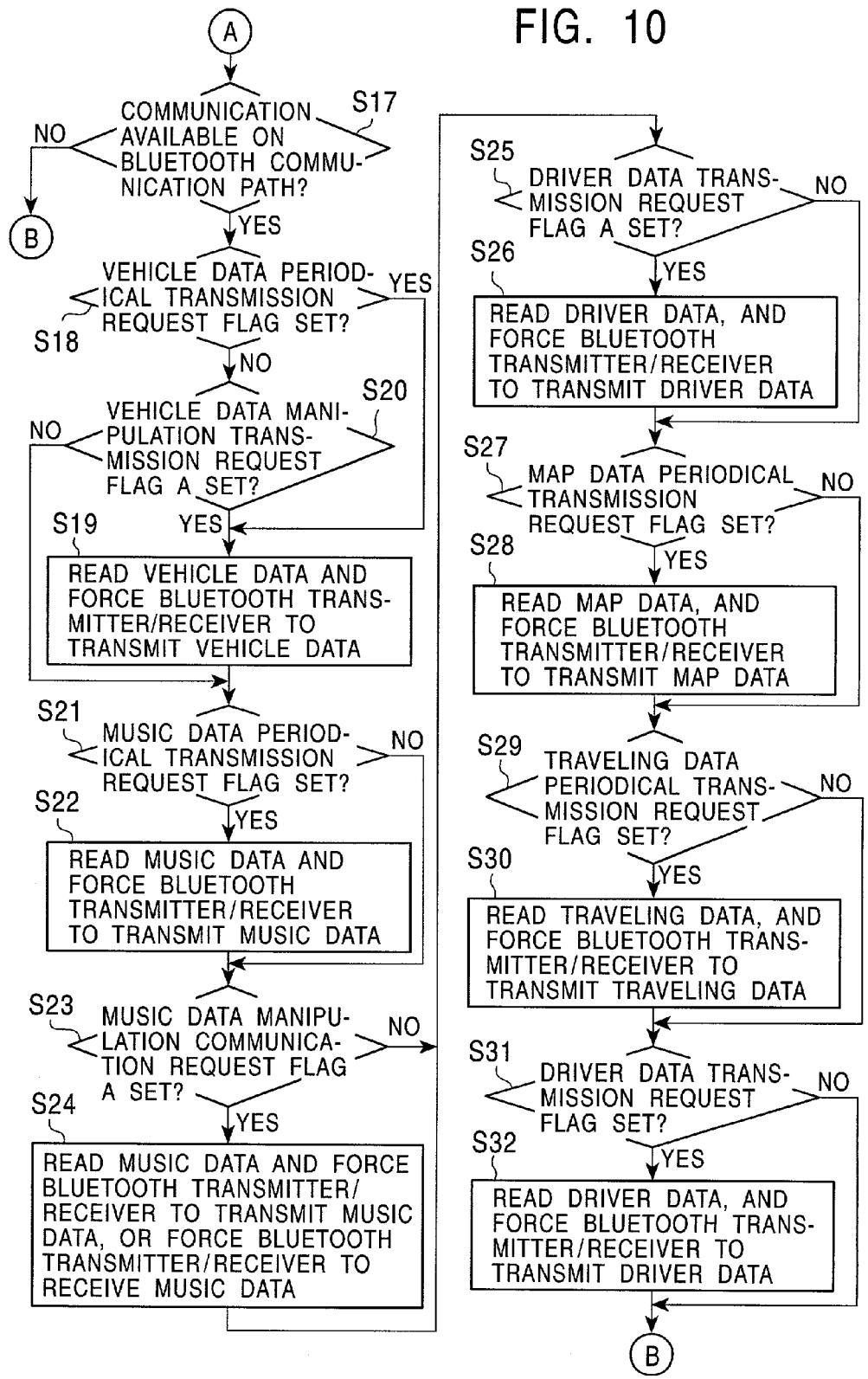
FIG. 10 is a flow chart illustrating a portion of the communication control routine continued from FIG. 9.
Figure 11:
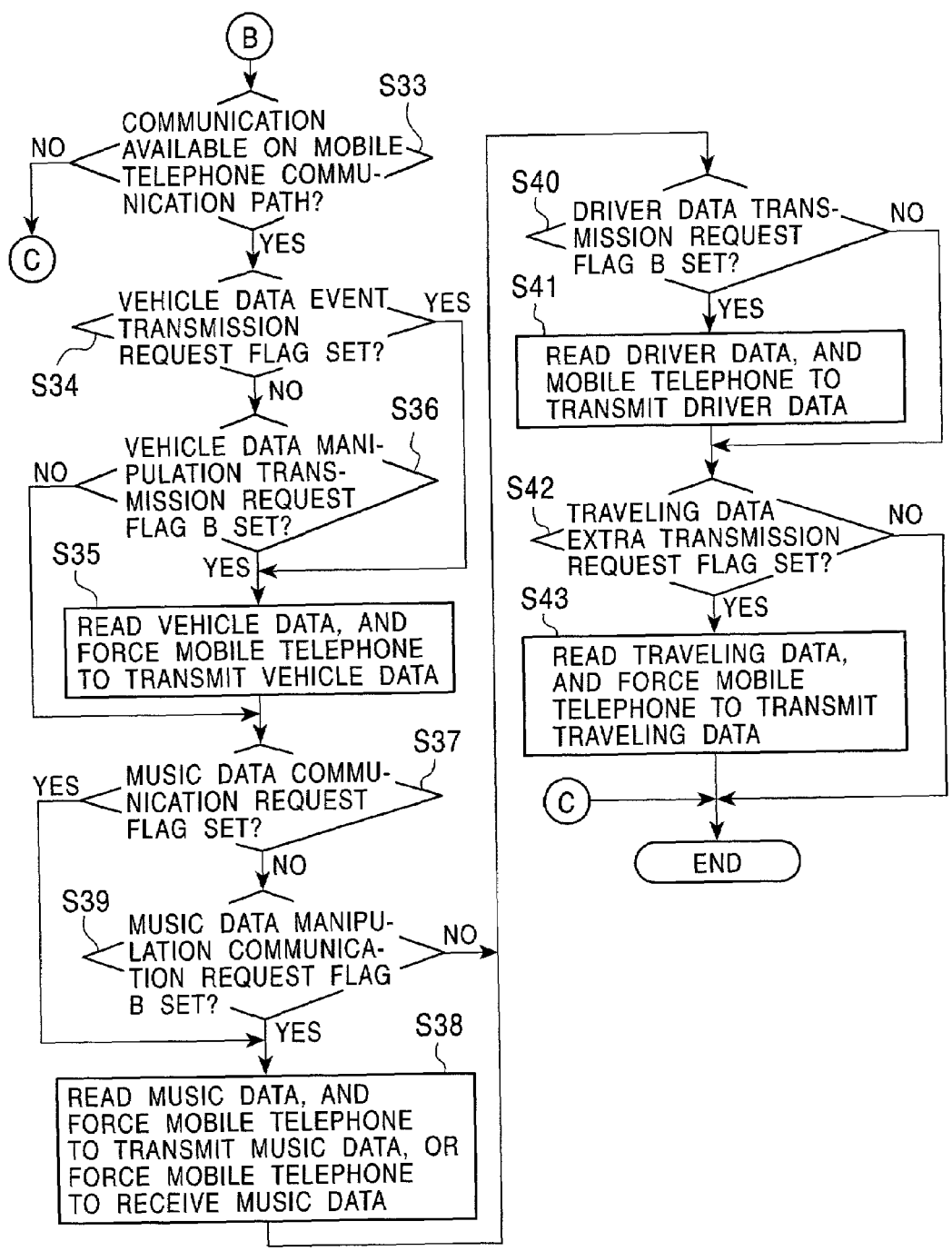
FIG. 11 is a flow chart illustrating a portion of the communication control routine continued from FIG. 10.

After executing the access point setting routine, the CPU 20 repeatedly executes a communication control routine illustrated in FIGS. 9 through 11, for example, every second. In the communication control routine, the CPU 20 first executes an emergency data communication setting routine (step S11).

Figure 12:
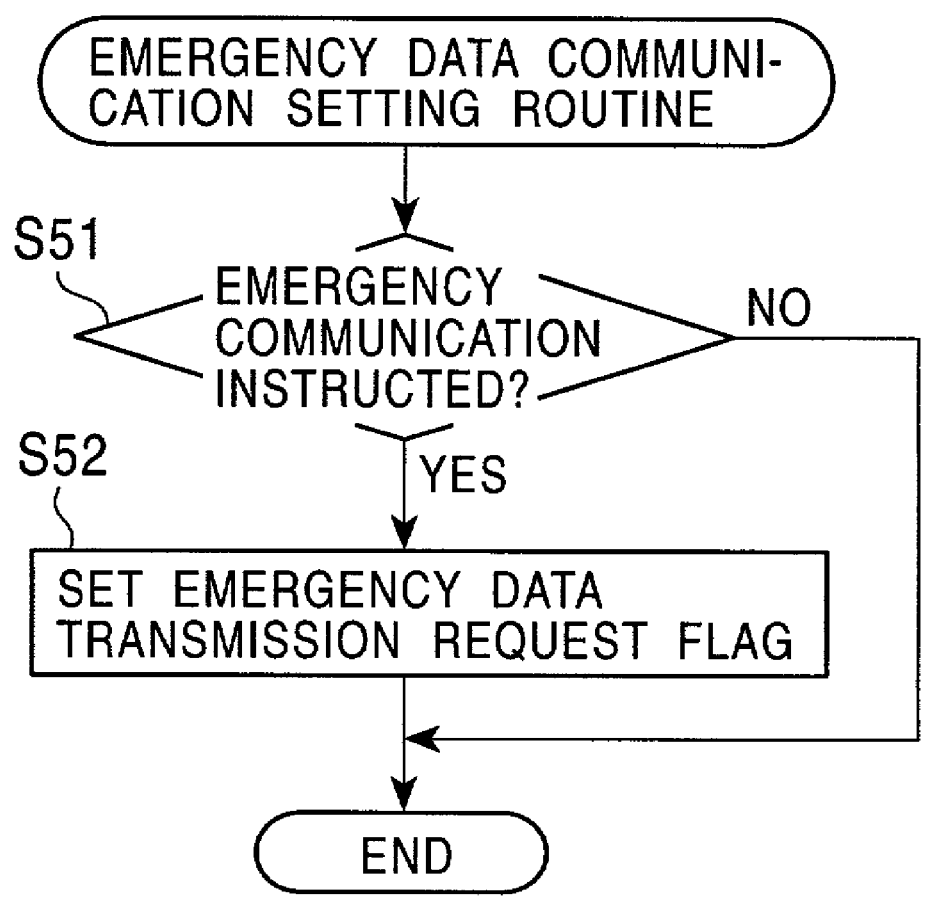
FIG. 12 is a flow chart illustrating an emergency data communication setting routine.

In the emergency data communication setting routine, the CPU 20 determines whether or not an emergency communication has been instructed (step S51), as illustrated in FIG. 12. If the user has manipulated the emergency alarm button 29g on the manipulation unit 26 to instruct an emergency communication, or if emergency data is stored in the storage device 28, an emergency data transmission request flag is set for using a mobile telephone communication path (step S52). The emergency data transmission request flag requests a preferential data communication.

After executing step S11, the CPU 20 determines whether or not the emergency data transmission flag has been set (step S12). If the emergency data transmission request flag has been set, the CPU 20 reads emergency data from the storage device 28 and forces the mobile telephone 22 to transmit the emergency data to the ASP server 4 (step S13). The destination is not limited to the ASP server 4, but may be another device such as the emergency alarm center device 10. While the vehicle may be positioned in a region in which a communication is not available through a mobile telephone communication path using the mobile telephone 22, i.e., in a region far away from an access point for mobile telephone, the CPU 20 repeatedly executes step S13 until a communication becomes available through a mobile telephone communication path.

After executing step S13, the CPU 20 determines whether or not an actual traveling route is along the traveling route set at step S2 (step S14). Step S14 is immediately executed if the CPU 20 determines at step S12 that the emergency data transmission flag has not been set. At step S14, the CPU 20 determines whether or not the current position of the vehicle is located on the traveling route set at step S2.

If the actual traveling route deviates from the set route, the CPU 20 again sets a traveling route to the destination (step S15), and extracts the access point nearest from the current position of the vehicle 14 from among access points on the traveling route which has been again set (step S16). This is an operation similar to those at steps S2 and S3.

If the actual traveling route is along the set route, the routine proceeds to step S17, where the CPU 20 immediately executes a variety of communication setting routines. Otherwise, when the CPU 20 executes steps S15 and S16, the routine proceeds to step S76.

As illustrated in FIG. 9, the CPU 20 executes in order a vehicle data communication setting routine (step S17), a driver data communication setting routine (step S18), a music data communication setting routine (step S19), a map data communication setting routine (step S20), a traveling data communication setting routine (step S21), and an address book data communication setting routine (step S22).

Figure 13:
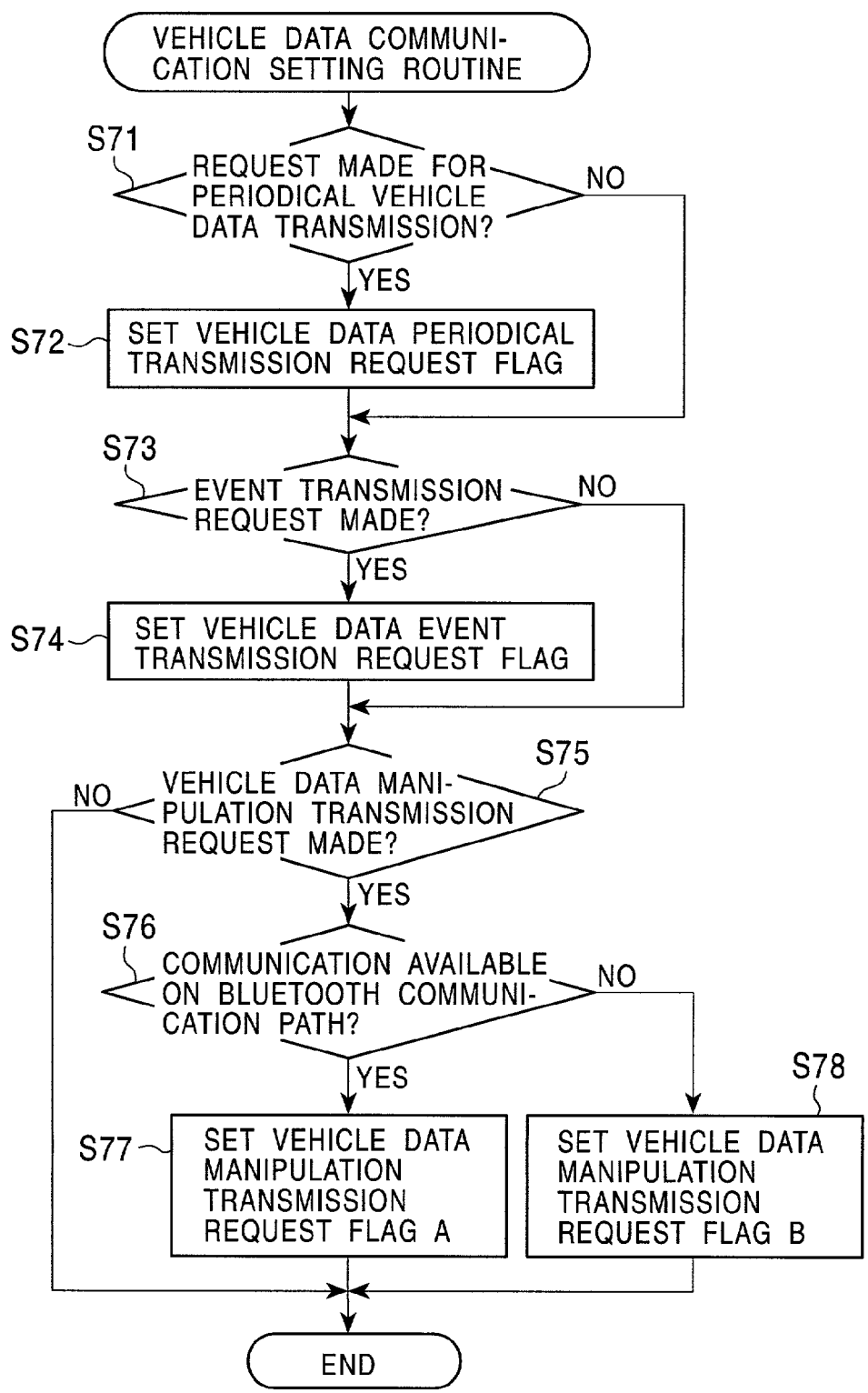
FIG. 13 is a flow chart illustrating a vehicle data communication setting routine.

In the vehicle data communication setting routine, as illustrated in FIG. 13, the CPU 20 first determines whether or not a periodical vehicle data transmission request has been made (step S71). The vehicle data is updated once a week as illustrated in FIG. 14, so that the CPU 20 determines at step S71 whether or not one week has elapsed from the preceding update date.

For each of the vehicle data, driver data, music data, map data, traveling data, address book data, and emergency data, the preceding update date as well as an update cycle are formed as an update table as shown in FIG. 14 in the storage device 28. The date on which corresponding data was transmitted to the ASP server 4 is written into an update date field in the update table.

If a periodical transmission request has been made due to the lapse of one week from the preceding update date, a vehicle data periodical transmission request flag is set for using the Bluetooth communication path (step S72).

If no periodical transmission request is made, the CPU 20 determines whether or not an event transmission request has been made (step S73). The determination at step S73 is immediately made likewise after the execution of step S72. The event transmission request is made when the vehicle fails in accordance with the vehicle data. For example, the event transmission request is made in response to an unusual condition of the vehicle such as abnormal combustion of the engine, decrease in the amount of oil below a threshold, decrease of the amount of gasoline below a threshold, decrease in air pressure of tires below a threshold, as well as exchange of a battery or a tire.

When the event transmission request is made, a vehicle data event transmission request flag is set for using a mobile telephone communication path (step S74). The vehicle data event transmission request flag requests a data communication preferential to the vehicle data periodical transmission request flag.

After executing step S74, the CPU 20 determines whether or not a vehicle data manipulation transmission request has been made (step S75). At step S75, the CPU 20 determines whether or not a request for transmitting vehicle data to a desired destination such as an arbitrary server has been made in response to a manipulation of the user. If the vehicle data manipulation transmission request has been made, the CPU 20 determines whether or not a communication is available on a Bluetooth communication path (step S76). Specifically, the CPU 20 determines whether or not the vehicle is located within an accessible range for a set access point for Bluetooth. For example, if a transmission signal from the Bluetooth repeater 11 can be received by the Bluetooth transmitter/receiver 21, a communication is available on the Bluetooth communication path. If a communication is available on the Bluetooth communication path, a vehicle data manipulation transmission request flag A is set (step S77). On the other hand, if a communication is not available on the Bluetooth communication path, a vehicle data manipulation transmission request flag B is set for using the mobile telephone communication path (step S78). Since the vehicle data manipulation transmission request has been made to perform a preferential data communication, the vehicle data is communicated through the Bluetooth communication path by setting the vehicle data manipulation transmission request flag A, if a communication is available on the Bluetooth communication path. If a communication is not available on the Bluetooth communication path, the vehicle data is communicated through the mobile telephone communication path by setting the vehicle data manipulation transmission request flag B.

Figure 15:
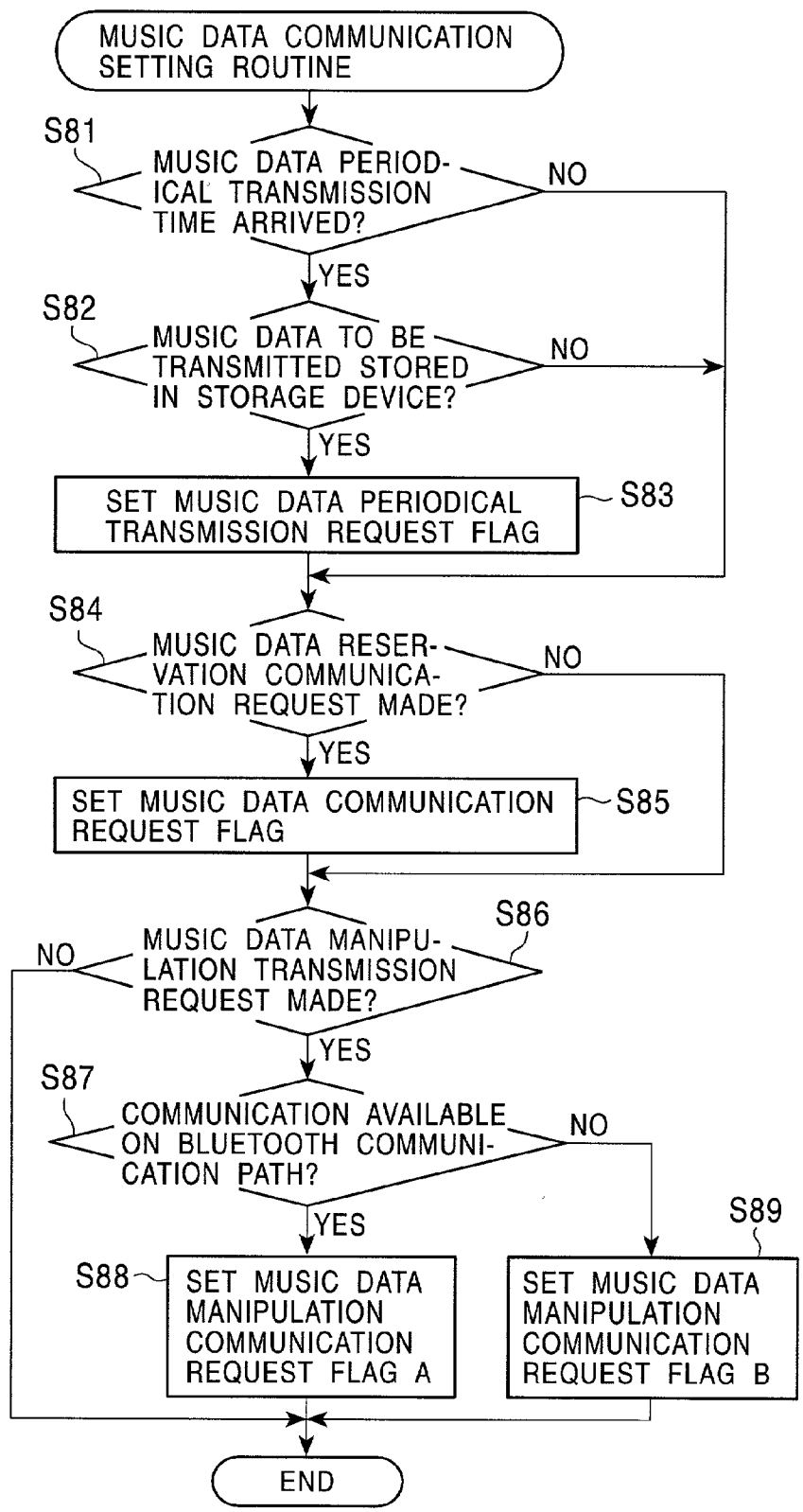
FIG. 15 is a flow chart illustrating a music data communication setting routine.

In the music data communication setting routine, as illustrated in FIG. 15, the CPU 20 first determines whether or not an audio data periodical transmission time has been reached (step S81). If a music data periodical upload time twice a day (for example, at 12:00 and 18:00) is arrived, the CPU 20 determines whether or not music data to be transmitted to the ASP server 4 has been preserved in the storage device 28 (step S82). If the music data to be transmitted is stored in the storage device 28, a music data periodical transmission request flag is set (step S83). While step S82 is limited to music data transmitted to the ASP server 4, the music data periodical transmission request flag may be set for music data which is to be transmitted to a device or a server other than the ASP server 4, if such music data has been preserved in the storage device 28.

On the other hand, if the audio data periodical transmission time has not been reached, the CPU 20 determines whether or not a music data reservation communication request has been made (step S84). If a reservation has been set for downloading or uploading music data to or from a predetermined server, the music data reservation communication request is made when the reserved time is reached. When the musical data reservation communication request has been made, a music data communication request flag is set (step S85). The music data periodical transmission request flag and the music data communication request flag are both set on the premise that a communication is performed through the Bluetooth communication path.

After executing step S85, the CPU 20 determines whether or not a music data manipulation communication request has been made (step S86). At step S86, the CPU 20 determines whether or not a request has been made, in response to a manipulation of the user, to upload music data to a desired destination such as an arbitrary server or to download music data from a desired destination. When the manipulation communication request has been made, the CPU 20 determines whether or not a communication is available on the Bluetooth communication path (step S87). Specifically, the CPU 20 determines whether or not the vehicle 14 is located within an accessible range to a set access point for Bluetooth. For example, a transmission signal from the Bluetooth repeater 11 can be received by the Bluetooth transmitter/receiver 21, a communication is available on the Bluetooth communication path. If a communication is available on the Bluetooth communication path, a music data manipulation communication request flag A is set (step S88). On the other hand, if a communication is not available on the Bluetooth communication path, a music data manipulation communication request flag B is set for using the mobile telephone communication path (step S89). Since the music data manipulation communication request is made to perform a preferential data communication, the music data is communicated through the Bluetooth communication path by setting the music data manipulation transmission request flag A, if a communication is available on the Bluetooth communication path. If a communication is not available on the Bluetooth communication path, the music data is communicated through the mobile telephone communication path by setting the music data manipulation transmission request flag B.

Figure 16:
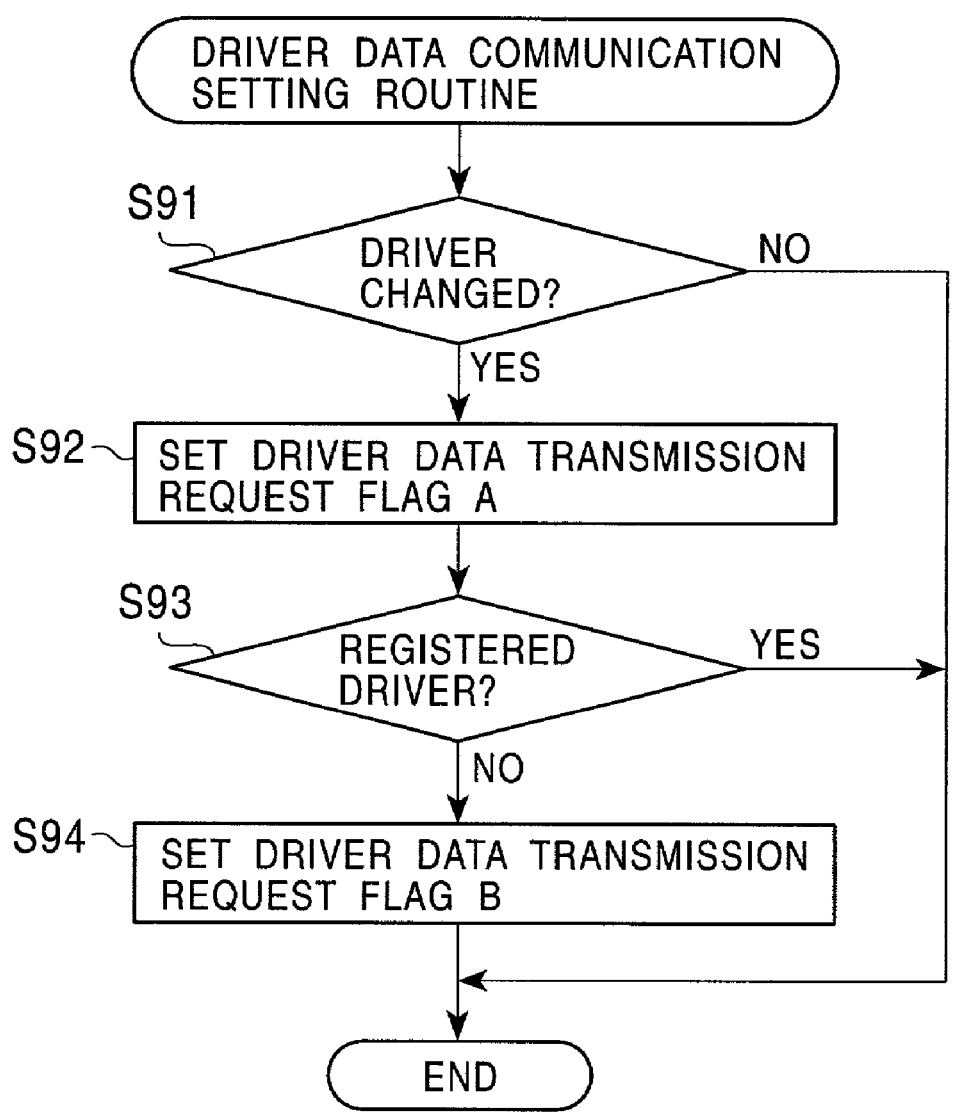
FIG. 16 is a flow chart illustrating a driver data communication setting routine.

In the driver data communication setting routine, as illustrated in FIG. 16, the CPU 20 first determines whether or not a driver has changed (step S91). A change of a driver is determined in the CPU 20 in accordance with an output signal from the driver detector 33. If a driver has changed, a driver data transmission request flag A is set for using the Bluetooth communication path (step S92).

The CPU 20 determines whether or not the driver is a registered driver (step S93). As described above, a registered driver has previously entered driver data such as his mane, sex, address, a driver identifiable parameter and so on, and the driver data has been stored in the storage device 28, so that the CPU 20 determines whether or not driver data is stored in the storage device 28 corresponding to a driver determined in accordance with an output signal from the driver detector 33. The vehicle is likely to be stolen if the determined driver is not a registered driver, and the information on the driver must be immediately notified, so that a driver data communication request flag B is set for using the mobile telephone communication path (step S94). The driver data transmission request flag B is set to request a data communication preferential to the driver data transmission request flag A. When step S94 is executed, the driver data transmission request flag A may be reset.

Figure 17:
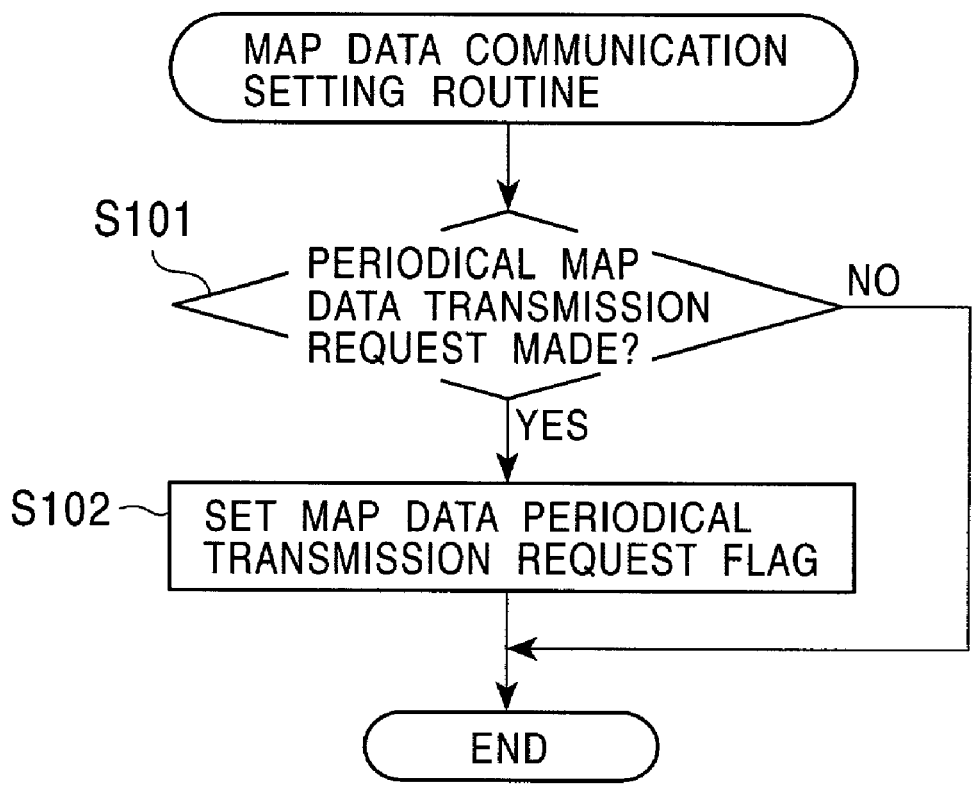
FIG. 17 is a flow chart illustrating a map data communication setting routine.

In the map data communication setting routine, as illustrated in FIG. 17, the CPU 20 first determines whether or not a periodical map data transmission request has been made (step S101). The map data is updated once a month as shown in FIG. 14, so that the CPU 20 determines at step S101 whether or not one month has elapsed from the preceding update date.

If a periodical map data transmission request is made due to the lapse of one month from the preceding update date, a map data periodical transmission request flag is set for using the Bluetooth communication path (step S102). Since the map data requires a large capacity, the map data is communicated through the Bluetooth communication path.

Figure 18:
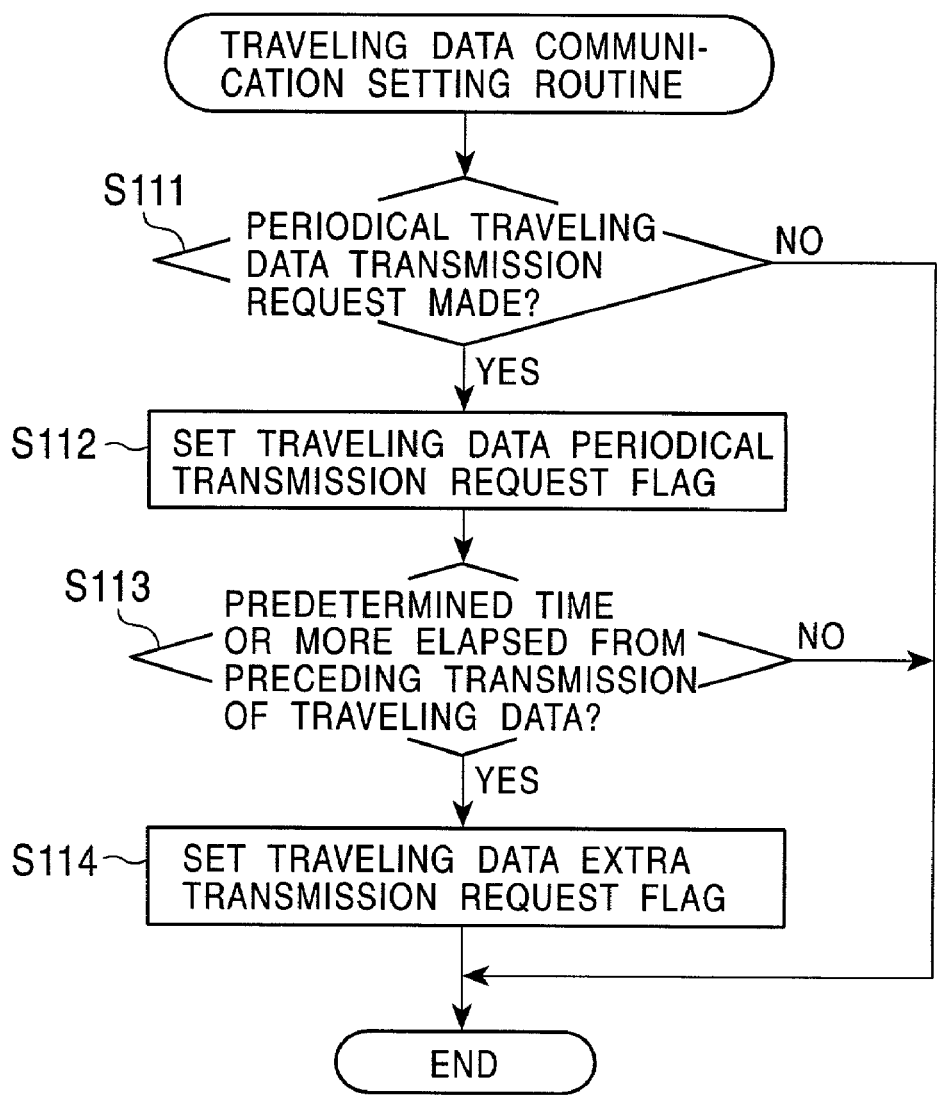
FIG. 18 is a flow chart illustrating a traveling data communication setting routine.

In the traveling data communication setting routine, as illustrated in FIG. 18, the CPU 20 first determines whether or not a periodical traveling data transmission request has been made (step S111). The traveling data is updated once every ten minutes as shown in FIG. 14, so that the CPU 20 determines at step S111 whether or not ten minutes have elapsed from the preceding update time.

If a periodical traveling data transmission request is made due to the lapse of ten minutes from the preceding update time, a traveling data periodical transmission request flag is set for using the Bluetooth communication path (step S112). The traveling data includes the current position of the vehicle detected by the GPS unit 24 in addition to traveling parameters of the vehicle such as the speed, engine rotational speed and so on of the vehicle detected by the vehicle traveling detector 25.

After executing step S112, the CPU 20 determines whether or not a predetermined time or more has elapsed from the preceding transmission of the traveling data (for example, a time slightly longer than the update cycle, i.e., ten minutes) (step S113). When the predetermined time or more has elapsed from the preceding transmission of the traveling data, a traveling data extra transmission request flag is set for using the mobile telephone communication path (step S114). If the predetermined time or more has not elapsed from the preceding transmission of the traveling data, the periodical traveling data transmission request flag set at step S112 for communication through the Bluetooth communication path is validated as it is. The traveling data is essentially transmitted to the ASP server 4 through the Bluetooth communication path. However, if the vehicle 14 takes an additional time to reach an accessible range to the access point for Bluetooth set at step S4 or S15, the traveling data extra transmission request flag is set for requesting a data communication preferential to the traveling data periodical transmission request flag to immediately transmit the traveling data through the mobile telephone communication path, as later described.

Figure 19:
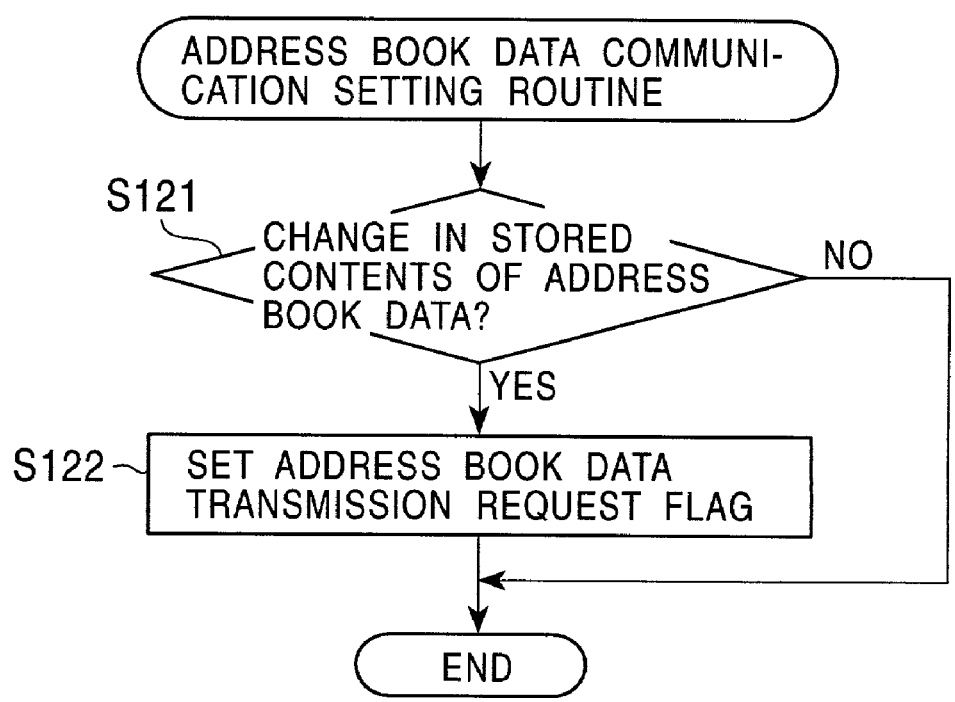
FIG. 19 is a flow chart illustrating an address book data communication setting routine.

In the address book data communication setting routine, as illustrated in FIG. 19, the CPU 20 first determines whether or not contents of recorded address book data have been changed (step S121). The storage device 28 stores address book data, and if the contents of stored address book data have been changed, an address book data transmission request flag is set for using the Bluetooth communication path (step S122). A change in the contents of stored address book data is determined by an address book data change flag which is set when the address book data is changed. The address book change flag is reset when the address book data is transmitted.

The address book data may include, by way of example, the owner of the vehicle, family members, friends, security company, police, fire station, and repair factory.

The flags set at step S11 and steps S17–S22 in the respective communication setting routines are reset each time the communication control routine is executed.

As the respective communication setting routines at steps S17–S22 have been completed as described above, the CPU 20 determines whether or not a communication is available on the Bluetooth communication path (step S17), as illustrated in FIG. 10. Specifically, the CPU 20 determines whether or not the vehicle 14 is located in an accessible range to the set access point for Bluetooth. If a communication is available on the Bluetooth communication path, the CPU 20 determines whether or not the vehicle data periodical transmission request flag has been set at step S72 (step S18). If the vehicle data periodical transmission request flag has been set, the CPU 20 reads the vehicle data from the storage device 28, and forces the Bluetooth transmitter/receiver 21 to transmit the vehicle data to the ASP server 4 (step S19). If the vehicle data periodical transmission request flag is not set, the CPU 20 determines whether or not the vehicle data manipulation transmission request flag A has been set at step S77 (step S20). If the vehicle data manipulation transmission request flag A has been set, the routine proceeds to step S19, where the CPU 20 reads the vehicle data from the storage device 28, and forces the Bluetooth transmitter/receiver 21 to transmit the vehicle data to the ASP server 4. Step S19 may be executed separately since both the vehicle data periodical transmission request flag and the vehicle data manipulation transmission request flag A may have been set.

After executing step S19, the CPU 20 determines whether or not the music data periodical transmission request flag has been set at step S83 (step S21). If the music data periodical transmission request flag has been set, the CPU 20 reads music data to be transmitted from the storage device 28, and forces the Bluetooth transmitter/receiver 21 to transmit the music data to the ASP server 4 (step S22).

After executing step S22, the CPU 20 determines whether or not the music data manipulation communication request flag A has been set at step S88 (step S23). If the music data manipulation communication request flag A has been set, the CPU 20 reads the music data to be transmitted from the storage device 28, and forces the Bluetooth transmitter/receiver 21 to transmit the music data to a desired destination for uploading, or to receive music data from a desired sender for downloading (step S24). The music data acquired by downloading is preserved in the storage device 28.

After executing step S24, the CPU 20 determines whether or not the driver data transmission request flag A has been set at step S92 (step S25). If the driver data transmission request flag A has been set, the CPU 20 reads the driver data from the storage device 28, and forces the Bluetooth transmitter/receiver 21 to transmit the driver data to the ASP server 4 (step S26).

After executing step S26, the CPU 20 determines whether or not the map data periodical transmission request flag has been set at step S102 (step S27). If the map data periodical transmission request flag has been set, the CPU 20 reads map data to be transmitted from the storage device 28, and forces the Bluetooth transmitter/receiver 21 to transmit the map data to the ASP server 4 (step S28).

After executing step S29, the CPU 20 determines whether or not the traveling data periodical transmission request flag has been set at step S112 (step S29). If the traveling data periodical transmission request flag has been set, the CPU 20 reads the traveling data from the storage device 28, and forces the Bluetooth transmitter/receiver 21 to transmit the traveling data to the ASP server 4 (step S30).

After executing step S30, the CPU 20 determines whether or not the address book data transmission request flag has been set at step S122 (step S31). If the address book data transmission request flag has been set, the CPU 20 reads changed address book data from the storage device 28, and forces the Bluetooth transmitter/receiver 21 to transmit the address book data to the ASP server 4 (step S32).

If the CPU 20 determines at step S17 that a communication is not available on the Bluetooth communication path, the CPU 20 determines whether or not a communication is available on the mobile telephone communication path (step S33), as illustrated in FIG. 11. Step S33 is executed likewise after execution of step S32. If an access point for mobile telephone communication has been set to make a communication available on the mobile telephone communication path, the CPU 20 determines whether or not the vehicle data event transmission request flag has been set at step S74 (step S34). Upon determining that the vehicle data event transmission request flag has been set at step S34, the CPU 20 reads the vehicle data from the storage device 28, and forces the mobile telephone 22 to transmit the vehicle data to the ASP server 4 (step S35). If the vehicle data event transmission request flag is not set, the CPU 20 determines whether or not the vehicle data manipulation transmission request flag B has been set at step S78 (step S36). If the vehicle data manipulation transmission request flag B has been set, the routine proceeds to step S35, where the CPU 20 reads the vehicle data from the storage device 28, and forces the mobile telephone 22 to transmit the vehicle data to the ASP server 4. The step S35 may be executed separately since both the vehicle data event transmission request flag and the vehicle data manipulation transmission request flag B may have been set.

After executing step S35, the CPU 20 determines whether or not the music data communication request flag has been set at step S85 (step S37). If the music data communication request flag has been set, the CPU 20 reads music data to be transmitted from the storage device 28, and forces the mobile telephone 22 to transmit the music data to a desired destination for uploading, or to receive music data from a desired sender for downloading (step S38). The music data acquired by the downloading is preserved in the storage device 28.

If the music data communication request flag is not set, the CPU 20 determines whether or not the music data manipulation communication request flag B has been set at step S89 (step S39). If the music data manipulation communication request flag B has been set, the routine proceeds to step S38, where the CPU 20 reads music data to be transmitted from the storage device 28, and forces the mobile telephone 22 to transmit the music data to a desired destination for uploading, or to receive music data from a desired sender for downloading. Step S38 may be executed separately since both the music data communication request flag and the music data manipulation transmission request flag B may have been set.

After executing step S38, the CPU 20 determines whether or not the driver data transmission request flag B has been set at step S94 (step S40). If the driver data transmission request flag B has been set, the CPU 20 reads the driver data from the storage device 28, and forces the mobile telephone 22 to transmit the driver data to the ASP server 4 (step S41).

After executing step S41, the CPU 20 determines whether or not the traveling data extra transmission request flag has been set at step S114 (step S42). If the traveling data extra transmission request flag has been set, the CPU 20 reads the traveling data from the storage device 28, and forces the mobile telephone 22 to transmit the traveling data to the ASP server 4 (step S43).

The ASP server 4 communicates with the onboard terminal device 1 in response to an access from the onboard terminal device 1, and operates for storing the vehicle-related data such as the emergency data, vehicle data, music data, driver data, map data, traveling data, address book data and so on, for each vehicle, in the storage device 4*a*. Thus, a similar database to the database formed in the storage device 28 in the onboard terminal device 1 can be formed in the storage device 4*a* of the ASP server 4.

As the onboard terminal device 1 accesses the ASP server 4 for preserving the vehicle-related data, the ASP server 4 requests a user identification code and a password, and authenticates the user using the user identification code and the password set from the onboard terminal device 1. Then, the ASP server 4 permits the onboard terminal device 1 to transmit the data, and accepts the sent data for storage in the storage device 4*a* to update the database.

In the foregoing embodiment, one is selectively used from two communication paths of different technical standards, i.e., the Bluetooth communication path and the mobile telephone communication path. Alternatively, one may be selectively used from three or more communication paths of different technical standards.

Determination as to which is used from among a plurality of communication paths of different technical standards is made in accordance with the type of data to be transmitted or received. For data having a large size such as music data, a high speed communication path is used, such as the Bluetooth communication path. In addition, the economy should be taken into consideration for this determination. Generally, the use of the mobile telephone communication path results in a higher cost, so that it is not suited for a long time use. Therefore, a costly communication path is used only for data having a large size.

On the other hand, for a data transmission request made through a manipulation of the user such as a driver, an immediate response is required, so that a communication path such as the mobile telephone communication path is preferentially selected irrespective of the cost because it has many access points and can immediately transmit data. Likewise, a communication path such as the mobile telephone communication path is selected for data which must be urgently transmitted, such as emergency data.

For periodically transmitting data such as the traveling data, a low cost and high speed communication path is preferentially used, such as the Bluetooth communication path. However, in a region in which a small number of access points are set, a periodical transmission time may have largely passed to result in a failure in data transmission. In such a case, data may be transmitted by switching the Bluetooth communication path to a communication path such as the mobile telephone communication path which is relatively available for communication at all times.

The ASP server 4 sets an access right for an access to the database formed in the storage device 4*a*. The access right is set for each device which can access the database as well as for each type of data. FIG. 20 shows types of data to which an access is granted to each device. Specifically, access granted data and access denied data have been previously set for the vehicle management center device 5, traveling management center device 6, home server 7, office server 8, music delivery center device 9, and urgent alarm center device 10. In FIG. 20, indicates data to which an access is granted, and indicates data to which an access is denied.

The user who utilizes the ASP server 4 has previously registered user registration information comprised of user name, user group, user identification code ID, password, telephone number, E-mail address and address, which is stored in the storage device 4*a*. Upon receipt of a read request for the database, the ASP server 4 reads the user registration information from the storage device 4*a* to determine an authorized user who has been registered, and grants a database access right to the user.

Next, a database access grant operation executed in the ASP server 4 will be described. Here, a grant of access requested by the vehicle management center device 5, traveling management center device 6, home server 7, office server 8, music delivery center device 9 and emergency alarm center device 10 will be described with reference to FIGS. 21 and 22.

Figure 21:
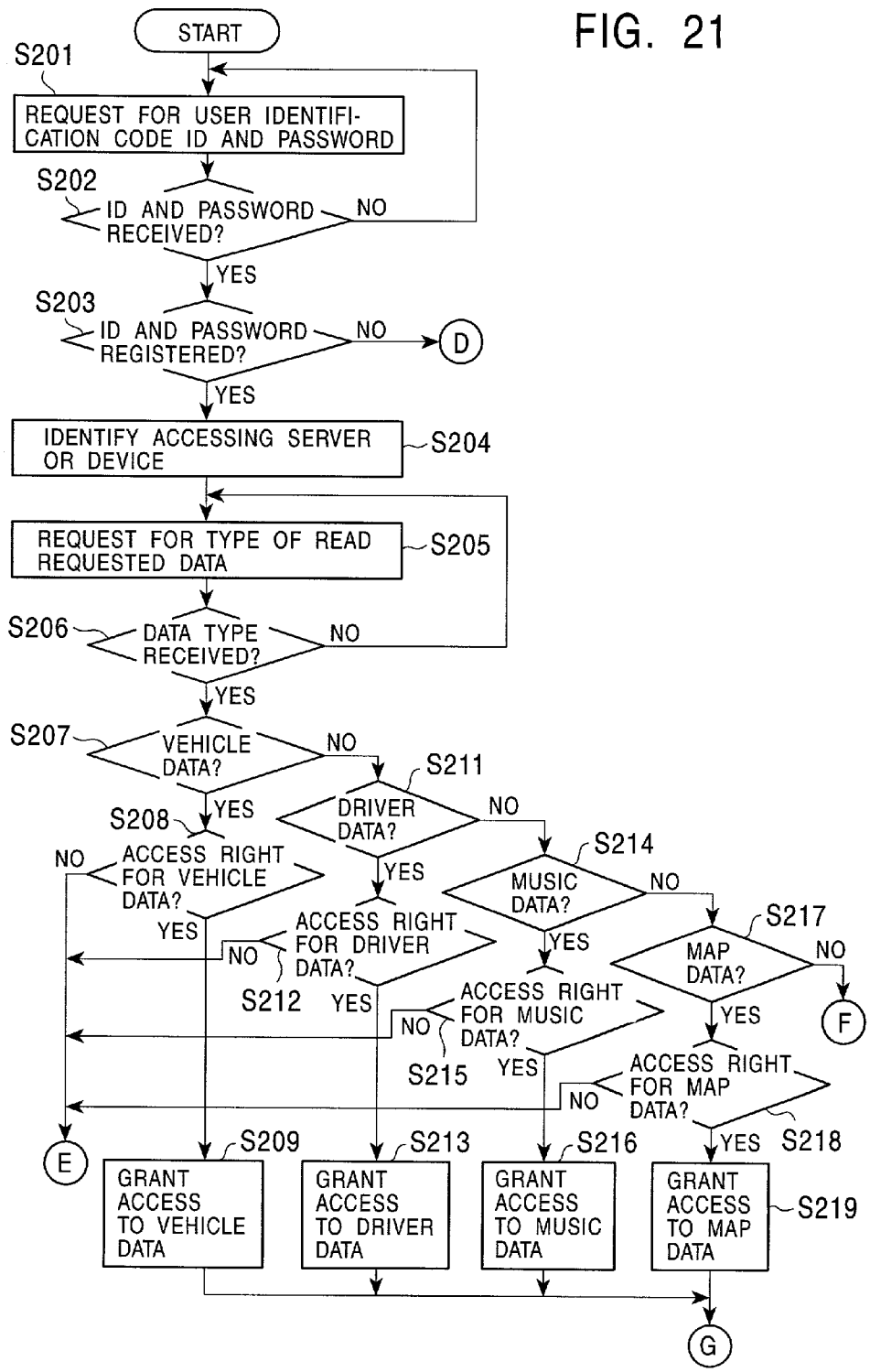
FIG. 21 is a flow chart illustrating an access grant operation.

As illustrated in FIG. 21, upon receipt of a database data read request, the ASP server 4 requests a user identification code and a password (step S201), and determines whether or not it has received the user identification code and the password (step S202). Receiving the user identification code and the password, the ASP server 4 determines whether or not user registration information including the received user identification code and password is stored in the storage device 4a (step S203). If user registration information including the received user identification code and password is found in the storage device 4a, the ASP server 4 identifies an accessing device or server from the user registration information including the received user identification code and password (step S204), and asks the accessing device or server which of vehicle-related data is requested in the data read request (step S205), and subsequently determines whether or not it has received the type of requested data (step S206).

When the received type of data is vehicle data (step S207), the ASP server 4 determines using an access right table whether or not an access to the vehicle data is permitted (step S208). As shown in FIG. 20, the storage device 4a has previously stores the access right table for indicating whether an access is permitted/denied for each type of data to devices and servers. In FIG. 20, the mark indicates access permitted data, while the mark indicates access denied data. Therefore, as can be seen from the access right table, since only the music delivery center device 9 is denied an access to the vehicle data, the ASP server 4 notifies a grant of access to the vehicle data if a data read request has been made by any of the devices 5, 6, 10 or the servers 7, 8, except for the music delivery center device 9 (step S209). On the other hand, if the data read request has been made by another device including the music delivery center device 9 or a server, the ASP server 4 notifies a denied access to the data (step S210).

When the received type of data is driver data (step S211), the ASP server 4 determines using the access right table whether or not an access to the driver data is permitted (step S212). As can be seen from the access right table shown in FIG. 20, since the ASP server 4 permits an access to the driver data from the devices 5, 6, 9, 10 and the servers 7, 8, the ASP server 4 notifies a grant of access to the driver data if a data read request has been made by one of devices 5, 6, 9, 10 and the servers 7, 8 (step S213). On the other hand, if the data read request has been made by a device or a server other than the devices 5, 6, 9, 10 and the servers 7, 8, the ASP server 4 notifies a denied access to the driver data (step S210).

When the received type of data is music data (step S214), the ASP server 4 determines using the access right table whether or not an access to the music data is permitted (step S215). As can be seen from the access right table shown in FIG. 20, since the ASP server 4 permits an access to the music data from the device 9 and the servers 7, 8, the ASP server 4 notifies a grant of access to the music data if a data read request has been made by one of device 9 and the servers 7, 8 (step S216). On the other hand, if the data read request has been made by a device or a server including the devices 5, 6, 10 other than the device 9 and the servers 7, 8, the ASP server 4 notifies a denied access to the driver data (step S210).

When the received type of data is map data (step S217), the ASP server 4 determines using the access right table whether or not an access to the map data is permitted (step S218). As can be seen from the access right table shown in FIG. 20, since the ASP server 4 permits an access to the map data from the devices 6, 9, 10 and the server 7, the ASP server 4 notifies a grant of access to the map data if a data read request has been made by one of devices 6, 9, 10 and the server 7 (step S219). On the other hand, if the data read request has been made by a device or a server including the device 5 and the server 8 other than the devices, 6, 9, 10 and the server 7, the ASP server 4 notifies a denied access to the map data (step S210).

Figure 22:
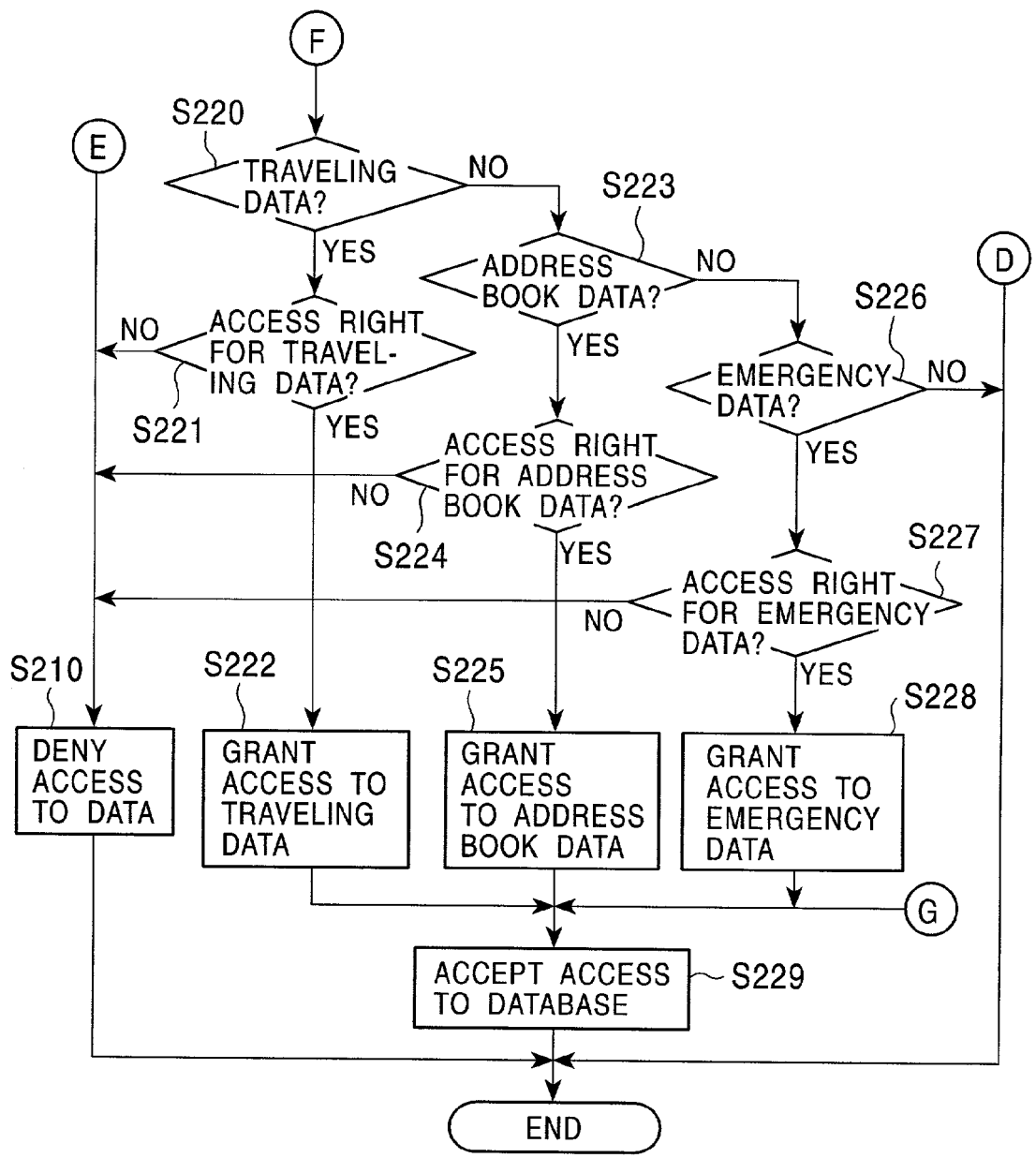
FIG. 22 is a flow chart illustrating a portion of the access grant operation continued from FIG. 21.

As illustrated in FIG. 22, when the received type of data is traveling data (step S220), the ASP server 4 determines using the access right table whether or not an access to the traveling data is permitted (step S221). As can be seen from the access right table shown in FIG. 20, since the ASP server 4 permits an access to the traveling data from the devices 5, 6, 10 and the server 7, the ASP server 4 notifies a grant of access to the traveling data if a data read request has been made by one of devices 5, 6, 10 and the server 7 (step S222). On the other hand, if the data read request has been made by a device or a server including the device 9 and the server 8 other than the devices, 5, 6, 10 and the server 7, the ASP server 4 notifies a denied access to the traveling data (step S210).

When the received type of data is address book data (step S223), the ASP server 4 determines using the access right table whether or not an access to the address book data is permitted (step S224). As can be seen from the access right table shown in FIG. 20, since the ASP server 4 permits an access to the address book data from the servers 7, 8, the ASP server 4 notifies a grant of access to the address book data if a data read request has been made by one of the servers 7, 8 (step S225). On the other hand, if the data read request has been made by a device or a server including the devices 5, 6, 9, 10 other than the serves 7, 8, the ASP server 4 notifies a denied access to the address book data (step S210).

When the received type of data is emergency data (step S226), the ASP server 4 determines using the access right table whether or not an access to the emergency data is permitted (step S227). As can be seen from the access right table shown in FIG. 20, since the ASP server 4 permits an access to the emergency data from the server 7 and the device 10, the ASP server 4 notifies a grant of access to the address book data if a data read request has been made by one of the device 10 and the servers 7 (step S228). On the other hand, if the data read request has been made by a device or a server including the server 8 and the devices 5, 6, 9 other than the serve 7 and the devices 10, the ASP server 4 notifies a denied access to the emergency data (step S210).

When the ASP server 4 permits an access to data, the ASP server 4 accepts the access to the permitted type of data in the database formed in the storage device 4a from a permitted device or server (step S229).

The access right may be set not for each of devices and servers but for each member in a user group. FIG. 23 shows contents of an access right table which indicates types of data to which an access is permitted when a vehicle accident occurs, corresponding to a user group. Specifically, access permitted data and access denied data have been previously set for a user group consisting of the owner, family members, friends, insurance company, police, fire station, and repair shop. In FIG. 23, the mark indicates access permitted data, while the mark indicates access denied data.

The user who utilizes the ASP server 4 has previously registered user registration information comprised of user name, user group, user identification code ID, password, telephone number, E-mail address and address, which is stored in the storage device 4a. Upon receipt of a read request for the database, the ASP server 4 reads the user registration information from the storage device 4a to determine an authorized user who has been registered, and grants a database access right to the user.

Figure 24:
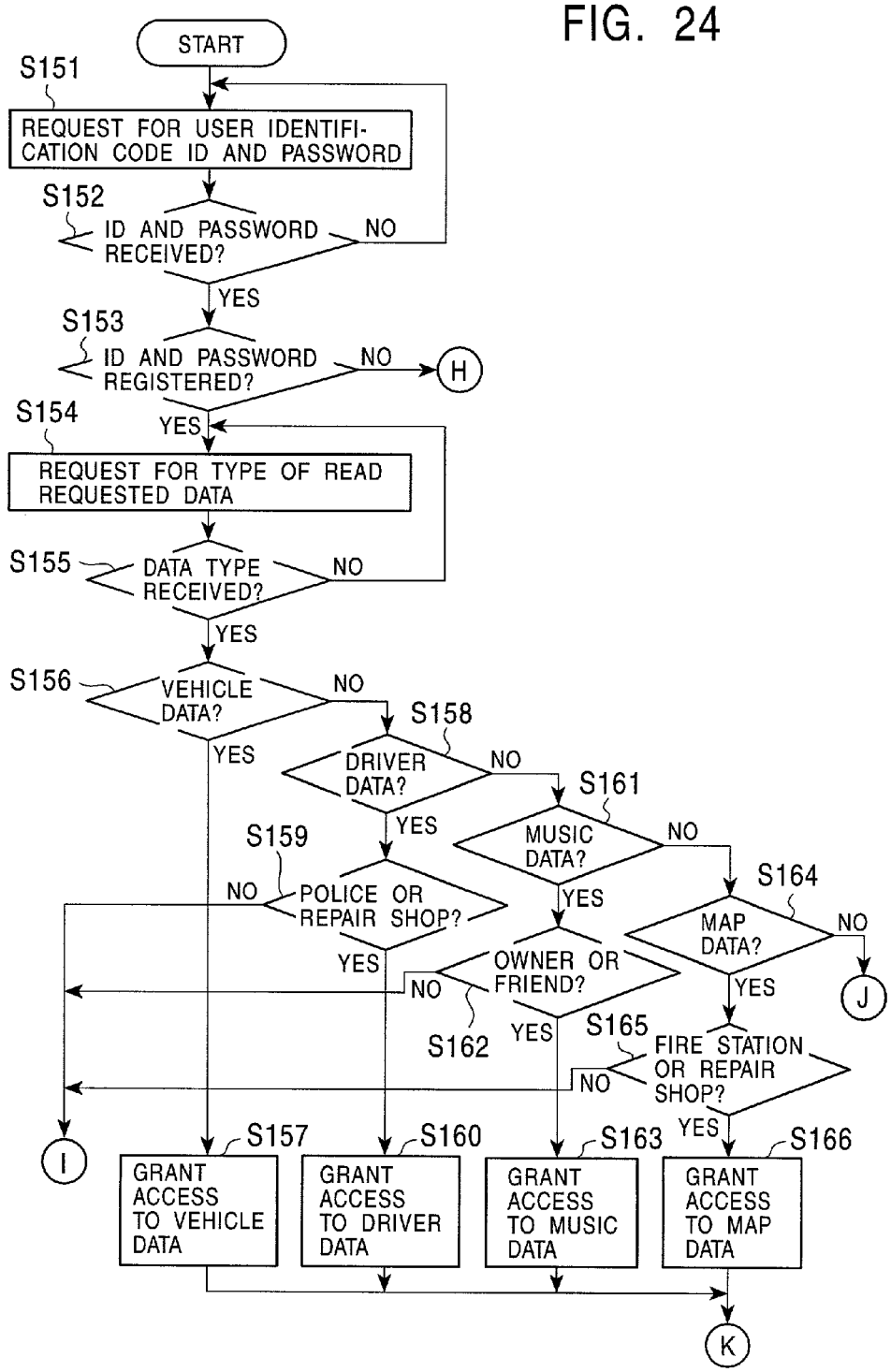
FIG. 24 is a flow chart illustrating an access grant operation.
Figure 25:
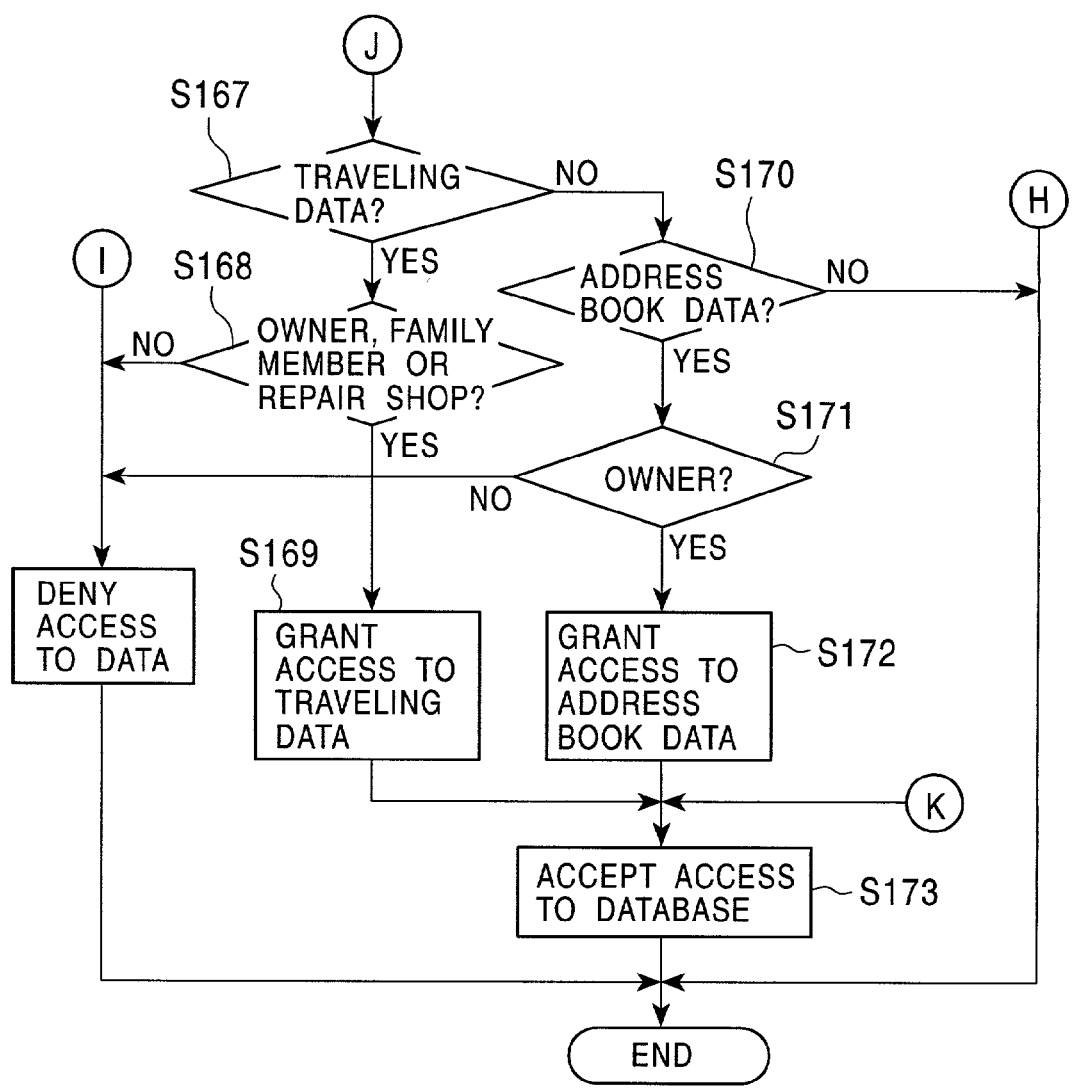
FIG. 25 is a flow chart illustrating a portion of the access grant operation continued from FIG. 24.

As illustrated in FIGS. 24 and 25, upon receipt of a database data read request, the ASP server 4 requests a user identification code and a password (step S151), and determines whether or not it has received the user identification code and the password (step S152). Receiving the user identification code and the password, the ASP server 4 determines whether or not user registration information including the received user identification code and password is preserved in the storage device 4a (step S153). If user registration information including the received user identification code and password are found in the storage device 4a, the ASP server 4 asks the accessing device or server which of vehicle-related data is requested in the data read request (step S154), and subsequently determines whether or not it has received the type of requested data (step S155).

If the received type of data is vehicle data (step 156), the ASP server 4 notifies a grant of access to the vehicle data (S157). If the received type of data is driver data (step S158), the ASP server 4 determines whether a user group is the police or a repair shop (step S159). The ASP server 4 acquires the user group from the user registration information used at step S153. As shown in FIG. 23, an access to the driver data is permitted to the user group except for the police and repair shop. If the user group which has requested the access is not the police or the repair shop, the ASP server 4 notifies a grant of access to the driver data (step S160). If the received type of data is music data (step S161), the ASP server 4 determines whether or not the user group is the owner or a friend (step S162). As shown in FIG. 23, an access to the music data is permitted if it is from the owner or a friend. If the user group which has requested the access is any of the owner or a friend, the ASP server 4 notifies a grant of access to the music data (step S163).

If the received type of data is map data (step S164), the ASP server 4 determines whether the user group is the fire station or a repair shop (step S165). As shown in FIG. 23, an access to the map data is permitted if it is from the user group except for the fire station and repair shop. If the user group which has requested the access is not the fire station or the repair shop, the ASP server 4 notifies a grant of access to the map data (step S166). If the received type of data is traveling data (step S167), the ASP server 4 determines whether the user group is the owner, a family member or a repair shop (step S168). As shown in FIG. 23, an access to the traveling data is permitted if it is from the user group which is the owner, a family member or a repair shop. If the user group which has requested the access is the owner, family member or repair shop, the ASP server 4 notifies a grant of the access to the traveling data (step S169). If the received type of data is address book data (step S170), the ASP server 4 determines whether or not the user group is the owner (step S171). As shown in FIG. 23, an access to the address book data is permitted if it is from the user group which is the owner. If the user group which has requested the access is the owner, the ASP server 4 notifies a grant of the access to the address book data (step S172).

When the ASP server 4 permits an access to the database, the ASP server 4 accepts the access to the permitted type of data in the database formed in the storage device 4a from a permitted device or server (step S173). Also, when the ASP server 4 permits an access to the database, the log is preserved in the storage device 4a or in a log server, not shown, as log data.

Since a database similar to the database formed in the storage device 28 of the onboard terminal device 1 is formed in the storage device 4a of the ASP server 4, it is possible to acquire data similar to that in the database of the onboard terminal device 1 in the vehicle 14 by accessing the storage device 4a of the ASP server 4. Also, since an access right has been previously set for each type of data stored in the storage device 4a of the ASP server 4, a particular type of data can be provided to a facility or a user group which is provided with a terminal device or a server. Furthermore, it is possible to prevent data from leaking to unauthorized users which might access the ASP server 4.

As described above, the data communication system according to the present invention can efficiently update a database for storing a variety of data related to a mobile unit such as a vehicle. Also, since the variety of data related to a mobile unit is built in a database, the database may be conveniently accessed for utilizing any of data related to the mobile unit.

This application is based on Japanese Patent Application No. 2000-291127 which is hereby incorporated by reference.

What is claimed is:

1. A mobile communication device for communicating a data signal through a predetermined network line, comprising:
   a plurality of radio transmitting/receiving devices which are different at least in data communication speed from one another;
   setting means for setting an access point for each of said plurality of radio transmitting/receiving devices in accordance with a current position of a mobile unit;
   first determining means for determining whether the data signal is to be transmitted or not as a periodically transmitted data signal due to a lapse of a predetermined period of time from a preceding update time;
   selecting means for selecting one having a higher communication speed of said plurality of radio transmitting/receiving devices when said first determining means determines that the data signal is to be transmitted as a periodically transmitted data signal;
   second determining means for determining whether a communication by the one radio transmitting/receiving device is available through the access point set by said setting means or not; and
   control means for controlling a data communication by the one radio transmitting/receiving device selected by said selecting means when said second determining means determines that a communication by said one radio transmitting/receiving device is available through the access point set by said setting means.

2. A mobile communication device according to claim 1, wherein said selecting means selects a radio transmitting/receiving device having a higher data communication speed from said plurality of radio transmitting/receiving devices as said one radio transmitting/receiving device when the data signal to be transmitted or received has a relatively large data size.

3. A mobile communication device according to claim 1, wherein said selecting means selects a radio transmitting/receiving device which is relatively available for communication at all times from said plurality of radio transmitting/ receiving devices as said one radio transmitting/receiving device when the data signal to be transmitted or received indicates emergency information which should be urgently communicated.

4. A mobile communication device according to claim 1, wherein said selecting means selects a radio transmitting/receiving device which is relatively available for communication at all times from said plurality of radio transmitting/receiving devices instead of said radio transmitting/receiving device having a higher data communication speed, as said one radio transmitting/receiving device, when said periodically transmitted data signal cannot be transmitted for a predetermined time period.

5. A mobile communication device according to claim 1, wherein said setting means sets a travel route from a current position to a destination of said mobile unit, and sets an access point located at the shortest distance from the current position of said mobile unit on the travel route for each of said plurality of radio transmitting/receiving devices.

6. A mobile communication device according to claim 1, wherein in a case that data transmission or reception is requested in accordance with a manipulation, said selecting means selects a radio transmitting/receiving device having a higher data communication speed as said one radio transmitting/receiving device when the radio transmitting/receiving device having a higher data communication speed is available for communication within said plurality of radio transmitting/receiving devices, and said selecting means selects a radio transmitting/receiving device which is relatively available for communication at all times from said plurality of radio transmitting/receiving devices as said one radio transmitting/receiving device when said radio transmitting/receiving device having a higher data communication speed is not available for communication.

7. A mobile communication device according to claim 1, wherein said predetermined network line is the Internet.

8. A mobile communication device according to claim 2, wherein said radio transmitting/receiving device having a higher data communication speed within said plurality of radio transmitting/receiving devices is a Bluetooth transmitter/receiver.

9. A mobile communication device according to claim 3, wherein said radio transmitting/receiving device which is relatively available for communication at all times within said plurality of radio transmitting/receiving devices is a mobile telephone.

10. A mobile communicating method for communicating data through a predetermined network line, comprising the steps of:
    determining whether a data signal is to be transmitted or not as a periodically transmitted data signal due to a lapse of a predetermined period of time from a preceding update time;
    selecting one having a higher communication speed of a plurality of radio transmitting/receiving devices which are different at least in data communication speed from one another when it is determined that the data signal is to be transmitted as a periodically transmitted data signal;
    setting an access point for each of said plurality of radio transmitting/receiving devices in accordance with a current position of a mobile unit;
    determining whether a communication by the one radio transmitting/receiving device is available though the set access point or not;
    controlling a data communication by the selected one radio transmitting/receiving device when it is determined that a communication by said one radio transmitting/receiving device is available through the set access point.

11. A mobile communicating method according to claim 10, wherein said predetermined network line is the Internet.

12. A mobile communication method according to claim 10, wherein said radio transmitting/receiving device having a higher data communication speed within said plurality of radio transmitting/receiving devices is a Bluetooth transmitter/receiver.

13. A mobile communication device for communicating data through a predetermined network line, comprising:
    a plurality of radio transmitting/receiving devices which are different at least in data communication speed from one another;
    a first circuit which sets an access point for each of said plurality of radio transmitting/receiving devices in accordance with a current position of a mobile unit;
    a second circuit which determines whether a data signal is to be transmitted or not as a periodically transmitted data signal due to a lapse of a predetermined period of time from a preceding update time;
    a third circuit which selects one having a higher communication speed of said plurality of radio transmitting/receiving devices when said second circuit determines that the data signal is to be transmitted as a periodically transmitted data signal;
    a fourth circuit which determines whether a communication by the one radio transmitting/receiving device is available through the access point set by said first circuit or not; and
    a fifth circuit which controls a data communication by the one radio transmitting/receiving device selected by said third circuit when said fourth circuit determines that a communication by said one radio transmitting/receiving device is available through the set access point.

14. A mobile communication device according to claim 13, wherein said third circuit which selects one of said plurality of radio transmitting/receiving devices selects a radio transmitting/receiving device having a higher data communication speed from said plurality of radio transmitting/receiving devices as said one radio transmitting/receiving device when the data signal to be transmitted or received has a relatively large data size.

15. A mobile communication device according to claim 13, wherein said third circuit which selects one of said plurality of radio transmitting/receiving devices selects a radio transmitting/receiving device which is relatively available for communication at all times from said plurality of radio transmitting/receiving devices as said one radio transmitting/receiving device when the data signal to be transmitted or received indicates emergency information which should be urgently communicated.

16. A mobile communication device according to claim 13, wherein said predetermined network line is the Internet.

17. A mobile communication device according to claim 14, wherein said radio transmitting/receiving device having a higher data communication speed within said plurality of radio transmitting/receiving devices is a Bluetooth transmitter/receiver.

18. A mobile communication device according to claim 15, wherein said radio transmitting/receiving device which is relatively available for communication at all times within said plurality of radio transmitting/receiving devices is a mobile telephone.

* * * * *